(12) United States Patent
Sánchez De La Fuente et al.

(10) Patent No.: US 12,225,236 B2
(45) Date of Patent: Feb. 11, 2025

(54) MISCELLANEOUS SIGNALING CONCEPTS FOR MULTI-LAYER VIDEO BITSTREAMS AND FOR OUTPUT TIMING DERIVATION

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/008,534

(22) PCT Filed: Jun. 9, 2021

(86) PCT No.: PCT/EP2021/065442
§ 371 (c)(1),
(2) Date: Dec. 6, 2022

(87) PCT Pub. No.: WO2021/250087
PCT Pub. Date: Dec. 16, 2021

(65) Prior Publication Data
US 2023/0345051 A1 Oct. 26, 2023

(30) Foreign Application Priority Data

Jun. 10, 2020 (EP) .................... 20179393

(51) Int. Cl.
*H04N 19/70* (2014.01)
*H04N 19/172* (2014.01)
*H04N 19/46* (2014.01)

(52) U.S. Cl.
CPC .......... *H04N 19/70* (2014.11); *H04N 19/172* (2014.11); *H04N 19/46* (2014.11)

(58) Field of Classification Search
CPC ....... H04N 19/70; H04N 19/172; H04N 19/46
See application file for complete search history.

(56) References Cited

U.S. PATENT DOCUMENTS

2014/0301485 A1 10/2014 Ramasubramonian et al.
2015/0016546 A1 1/2015 Wang et al.
(Continued)

OTHER PUBLICATIONS

Bross et al.; VVC Draft 9; Apr. 24, 2020 (Year: 2020).*
(Continued)

*Primary Examiner* — Jonathan R Messmore
(74) *Attorney, Agent, or Firm* — NIXON & VANDERHYE P.C.

(57) ABSTRACT

A first aspect provides concepts for handling coded layer video sequence boundaries in multilayered video bitstreams having inter-layer references. A second aspect provides concepts for handling, signaling and deriving of picture output timing, e.g. with respect to an access unit specific signaling and an output layer specific signaling of a number of repetitions of a picture output.

14 Claims, 12 Drawing Sheets

(56) References Cited

U.S. PATENT DOCUMENTS

Figure 1:
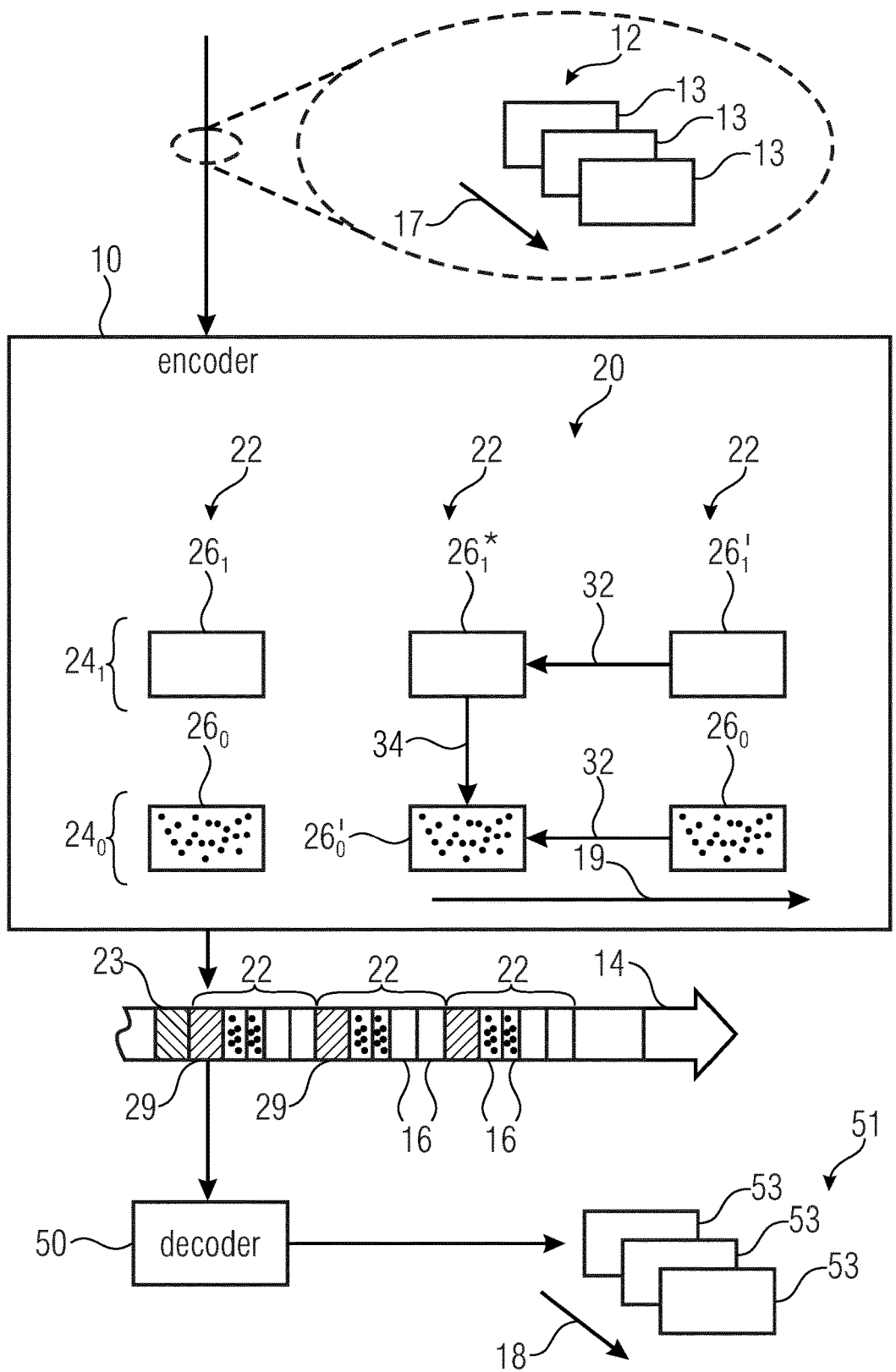

2015/0181233 A1  6/2015  Ramasubramonian et al.
2021/0368183 A1* 11/2021 Deshpande ............ H04N 19/31
2023/0016439 A1*  1/2023 Deshpande ............ H04N 19/70

OTHER PUBLICATIONS

International Search Report for PCT/EP2021/065442, mailed Jul. 26, 2021, 4 pages.
Written Opinion of the ISA for PCT/EP2021/065442, mailed Jul. 26, 2021, 10 pages.
He et al., "AHG9: On HLS Editorial cleanup", Document: JVET-S0110v2, 131. MPEG meeting; Jun. 29, 2020-Jul. 3, 2020; OnLine, May 24, 2020, 2 pages.
Wang et al., "AHG9: On cross-layer alignments in HEVC 3DV and scalable extensions", Document: JCTVC-M0266, 13. JCT-VC meeting; 104. MPEG meeting; Apr. 18, 2013-Apr. 26, 2013, Apr. 9, 2013, 6 pages.

* cited by examiner pt_display_elemental_periods_minus1 = 0

MISCELLANEOUS SIGNALING CONCEPTS FOR MULTI-LAYER VIDEO BITSTREAMS AND FOR OUTPUT TIMING DERIVATION

This application is the U.S. national phase of International Application No. PCT/EP2021/065442 filed Jun. 9, 2021, which designated the U.S. and claims priority to EP patent application Ser. No. 20/179,393.2 filed Jun. 10, 2020, the entire contents of each of which are hereby incorporated by reference.

Embodiments of the present disclosure relate to video encoders, video decoders, methods for encoding a video sequence into a video bitstream, and methods for decoding a video sequence from a video bitstream. Further embodiments relate to video bitstreams.

A video may be coded into a video bitstream in units of one or more coded video sequence, each comprising a sequence of access units which include one or more pictures of a common time frame of the video. In the case of multilayered video bitstreams, in which the video data is encoded into multiple layers of the video bitstream, the layers may include individual coded layer video sequences, the coded layer video sequences of different layers not necessarily being required to start/stop with the same access units. Coded layer video sequences may start with an independently coded picture, e.g., an IRAP picture which may be decoded independently from pictures of access units different from the access unit of the dependently coded picture. There may be a first type of independently coded picture, for example, a CRA picture to which a picture of the same layer may be associated, which picture follows the first type picture in coding order but is scheduled for presentation before the first type picture. Such a picture may be referred to as RASL picture. Such a RASL picture may have references to pictures preceding the first type picture to which the RASL picture is associated in decoding order. In other words, the RASL picture may have a reference to a picture in a preceding coded layer video sequence. Consequently, there may be cases, in which the reference pictures for the RASL picture are not present within the video bitstream, so that the RASL picture may not be correctly decoded. In this case, there may be an indication that pictures preceding the first type picture in presentation order are to be excluded from output. However, a RASL picture may serve as inter-layer reference picture for a picture of a different layer. In cases, in which the RASL picture is not decodable, also a picture which depends on the RASL picture may not be decoded correctly.

A first aspect of the present disclose provides a concept for handling coded layer video sequence boundaries in multilayered video bitstreams. Embodiments according to the first aspect may prevent that pictures having an inter-layered reference to a RASL picture, which RASL picture is not decodable or excluded from output, are indicated for output. To this end, such pictures having an inter-layer reference to RASL pictures not being decodable correctly either do not exist in the video bitstream or are excluded from output.

According to an embodiment of the first aspect, in encoding a first layer and a second layer into a multilayered video bitstream so that the first layer depends on the second layer, an encoder encodes within a next access unit among subsequent access units, which follow, in coding order, an access unit which comprises an end of sequence identifier in the second layer, which next access unit is the nearest access unit to the access unit having the end of sequence identifier in the second layer into which a picture is to be encoded in the first layer, the picture which is to be encoded into the first layer using decoding refresh and without any output of leading pictures. As the first picture of the next access unit is encoded using decoding refresh and with no output of leading pictures, for example, a picture having an inter-layer reference to a RASL picture of the second layer needs to also be a RASL picture, and thus may be prevented from output by indicating, that leading pictures are not to be output. Indicating that leading picture are not to be output may prevent that pictures which depend, also indirectly by means of inter-layer referencing, on a picture which is part of the coded layer video sequence of the second layer which is indicated to end at the end of the sequence identifier of the second layer, is to be output.

A second aspect of the present disclosure is concerned with output timing of decoded pictures, that is, the output times at which decoded pictures are output from an output buffer of a decoder. Derivation of the picture output timing may, for example, be signaled on access unit level e.g., by means of a picture timing supplemental enhancement information, PT SEI. Additionally or alternatively, picture output timing may be signaled on output layer level, i.e., referring to an individual output layer of video bitstream. For example, the information about the picture output timing for the access units and/or for the output layers may include information about a number of times a picture is to be output, i.e., repeated.

According to a first sub-aspect of the second aspect, a gating flag is provided in the video bitstream, which signals whether a PT SEI message included in the video bitstream includes a picture output multiplication syntax element. The picture output multiplication syntax element indicates whether or not pictures of an access unit to which it refers are subject to multiplied picture output and, if so, how many output pictures are to be generated out of the pictures of the access unit. The gating flag provides means for differentiating whether information regarding multiplied picture output are to be retrieved from the PT SEI message or by other means, e.g., by a frame field SEI message, which refers to an individual output layer. Thus, the signaling of the gating flag allows for a signaling of different frame rates in different output layers of an output layer set. In other words, the gating flag allows to signal multiplied picture output individually for different pictures within one access unit.

A second sub-aspect of the second aspect provides a concept for using multiplied picture output of pictures of an access unit in conjunction with a frame field syntax element, which indicates where the pictures of a picture sequence represent fields or frames, e.g., interlaced or progressive pictures. Thus, embodiments of the second sub-aspect allow for a signalization of picture output times in cases in which frames or fields are used.

A third sub-aspect of the second aspect provides a concept for signaling a number of times of a picture output by means of a picture output multiplication syntax element of a PT SEI referring to an access unit of the video bitstream and a further picture output multiplication syntax element of a frame field SEI referring to an output layer of the video bitstream. according to an embodiment, the picture output multiplication syntax element is equal to or smaller than the further picture output multiplication syntax element, for example, the further picture output multiplication syntax element is an integer multiple of the picture output multiplication syntax element. The picture output multiplication syntax element including in the PT SEI message may be access unit specific and thus, may allow for determining a picture refresh interval for output that is achieved as a result of the repetition or multiplication indicated by the picture output multiplication syntax element. Thus, by means of the picture output multiplication syntax element, a timing information for picture output relative to access units, and, in case of multiplications, a spacing between pictures that are presented in between may be determined. The further picture output multiplication syntax element signaled in the frame field SEI message may provide layer specific information as of how often a picture is required to be repeated so as to be able to present the content at the picture refresh interval, i.e., the one determined from the picture output multiplication syntax element. Requiring the further picture output multiplication syntax element to be equal to or greater than, e.g., integer multiple, of the picture output multiplication syntax element may ensure, that the picture refresh interval signaled by the picture output multiplication syntax element is achieved by the number of picture output times signaled by the further picture output multiplication syntax element. For example, in the case of a first field and a second field, the further picture output multiplication syntax element may signal a multiplication value corresponding to twice a multiplication value signaled by the picture output multiplication syntax element.

A fourth sub-aspect of the second aspect provides a concept for deriving from the video bitstream whether an output frame rate is constant beyond a boundary between subsequent coded video sequences, e.g., without explicitly signaling this information in the video bitstream. Inferring this information instead of explicit signaling provides the advantage that the respective information does not have to be amended or checked whether it is still two when splicing the video bitstream.

A fifth sub-aspect of the second aspect for deriving element picture output times (e.g. output times of access units) of a coded video sequence based on an elemental output picture duration syntax element, e.g., elemental_duration_in_tc_minus1, which may be part of a parameter set, e.g., a video parameter set or a sequence parameter set having HRD and timing information. The concept relies on the idea to promise that an access unit is inferable to be not subject to multiplied output if one or more syntax elements which are encoded into the video bitstream have a first state. Consequently, in a case in which the information whether or not pictures of an access unit are subject to multiplied output can be inferred, the concept may allow to determine the element picture output times without requiring a PT SEI message signaling this information. For example, in this case the elemental output picture times may be derived on the basis of an information about output times of individual pictures, as it may, e.g., be provided by the elemental output picture duration syntax element. Thus, the concept may allow to derive the elemental picture output times in absence of an PT SEI message and/or may allow to omit a signaling of the PT SEI message.

A sixth sub-aspect of the second aspect provides a concept for a treatment of no output pictures in video bitstreams for which a fixed picture rate is signaled. According to the sixth sub-aspect, a picture preceding a no output picture, i.e., a picture which is indicated to be omitted from output, is repeated, if a fixed picture rate is indicated for the video bitstream. Accordingly, a fixed picture rate may be maintained even in the presence of no output pictures.

Figure 2:
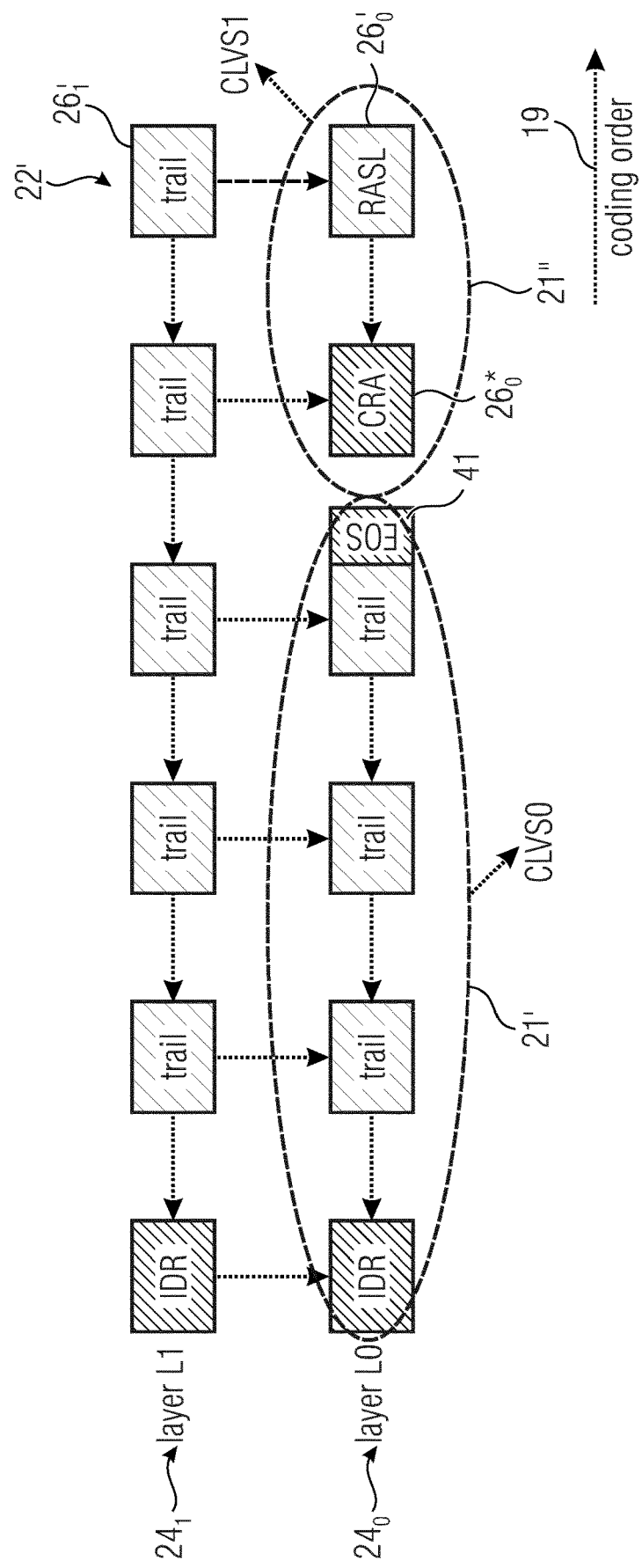
Figure 3:
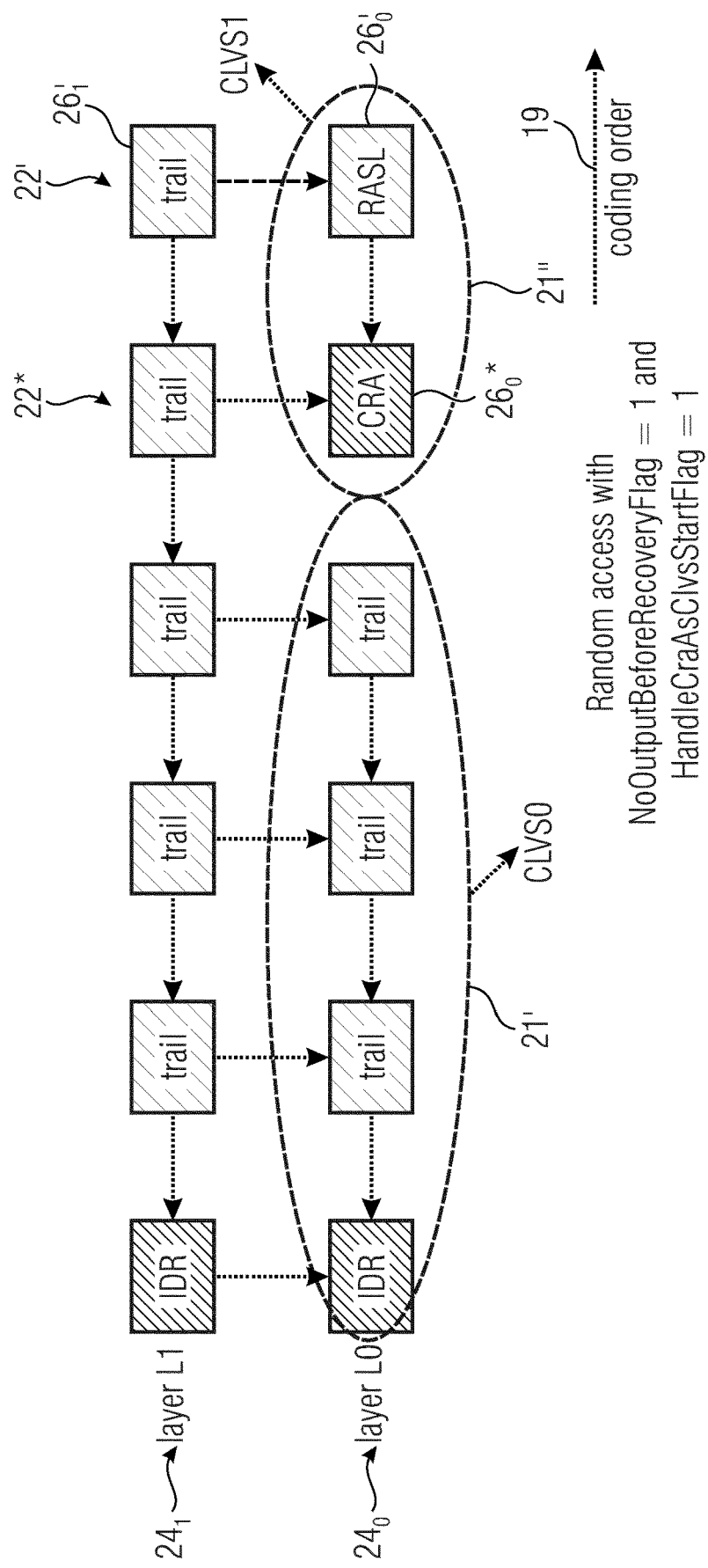
Figure 4:
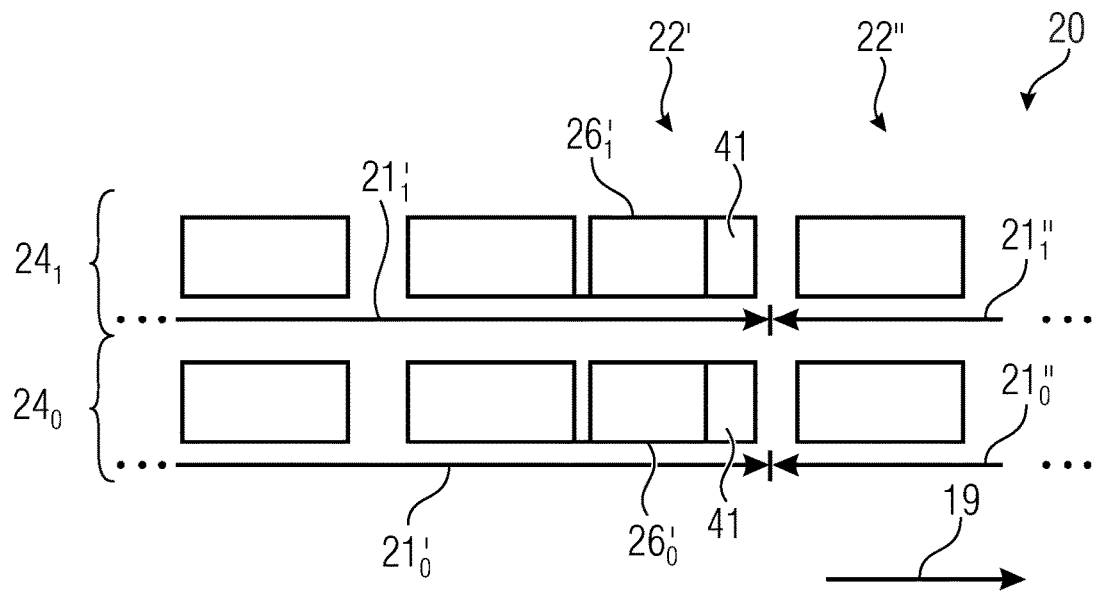
Figure 5:
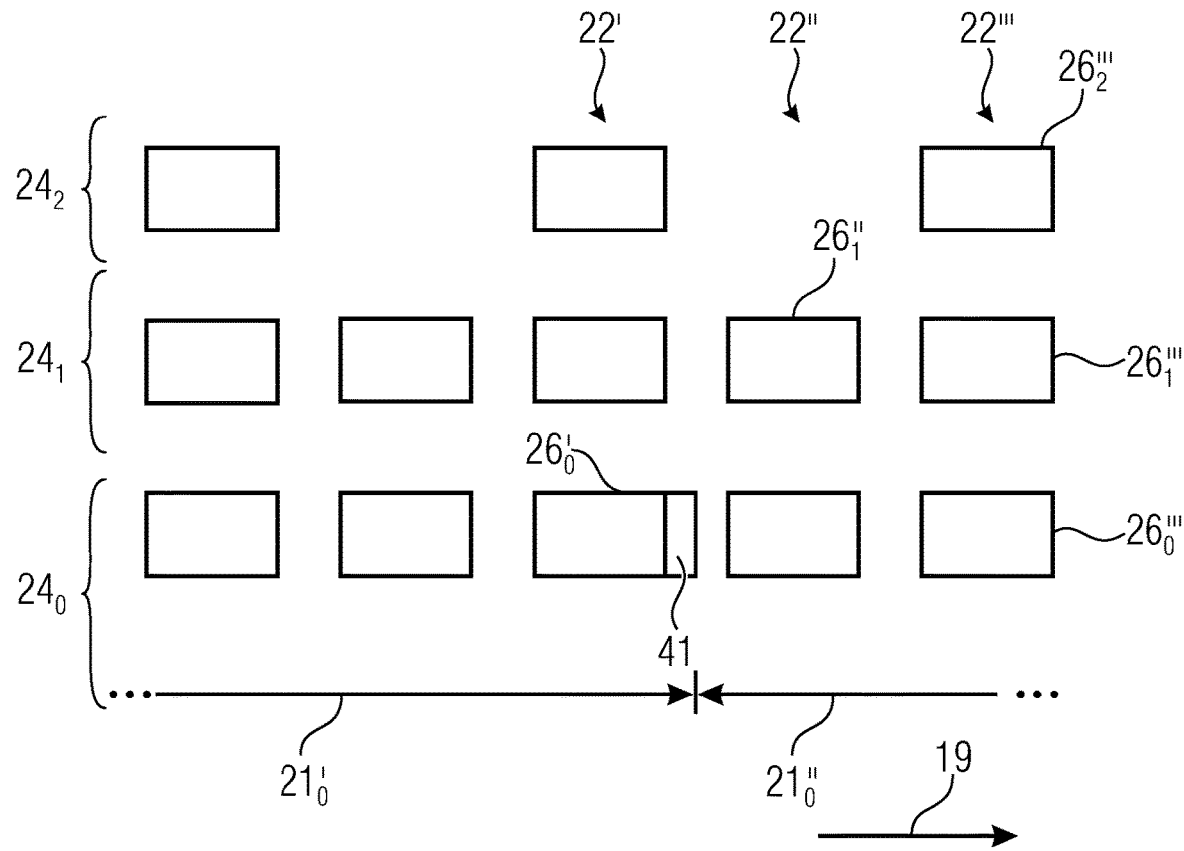
Figure 6:
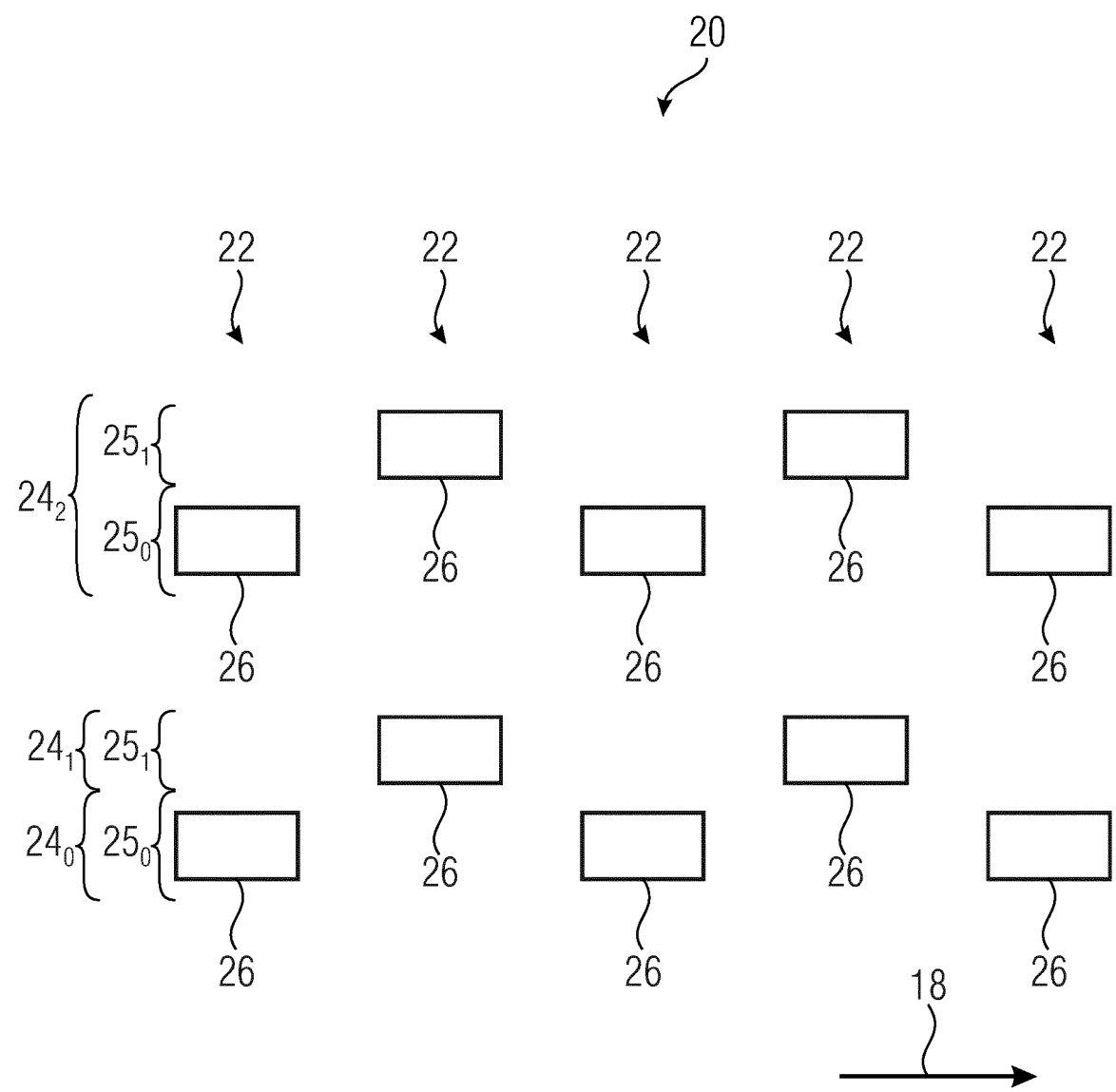
Figure 7:
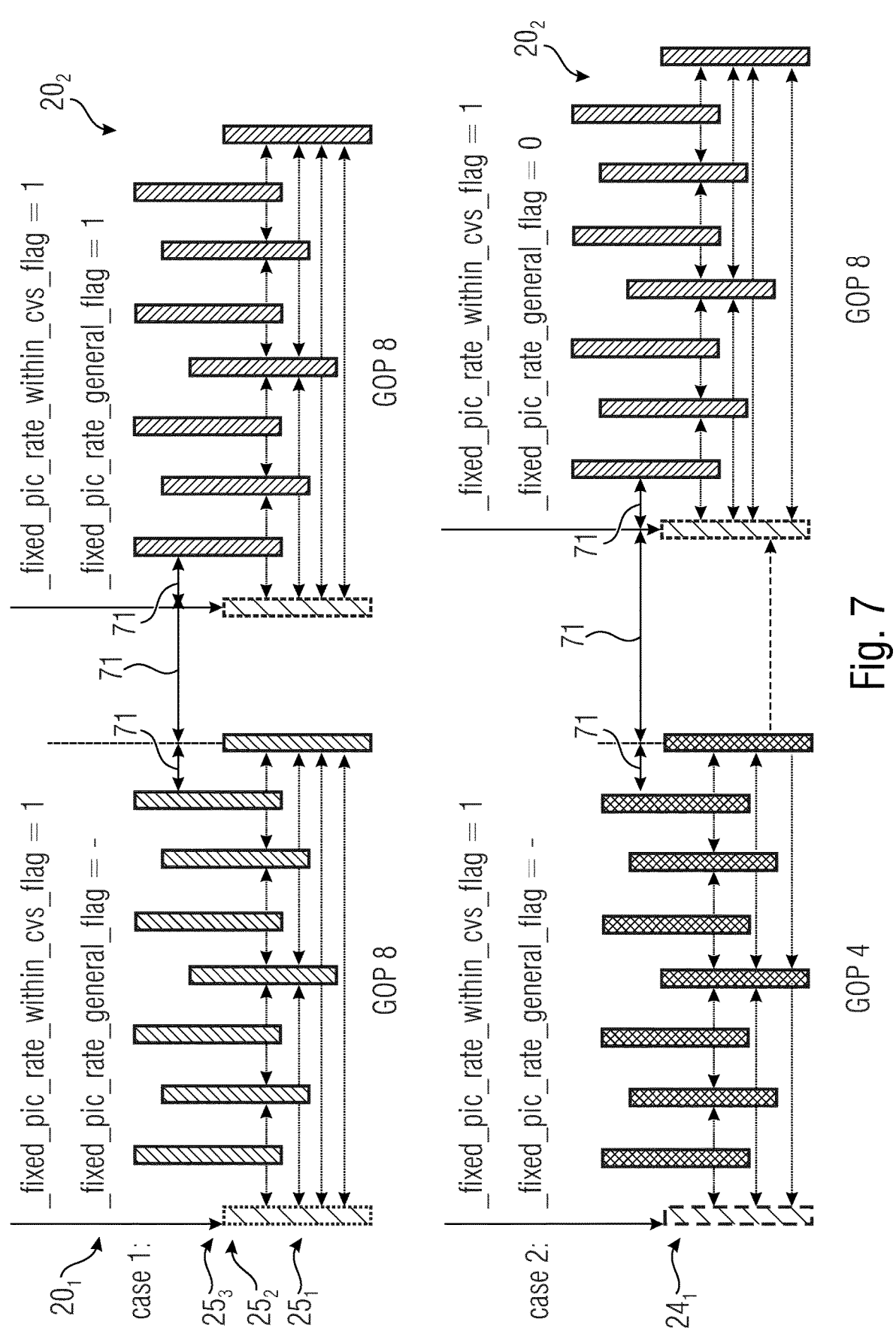
Figure 8:
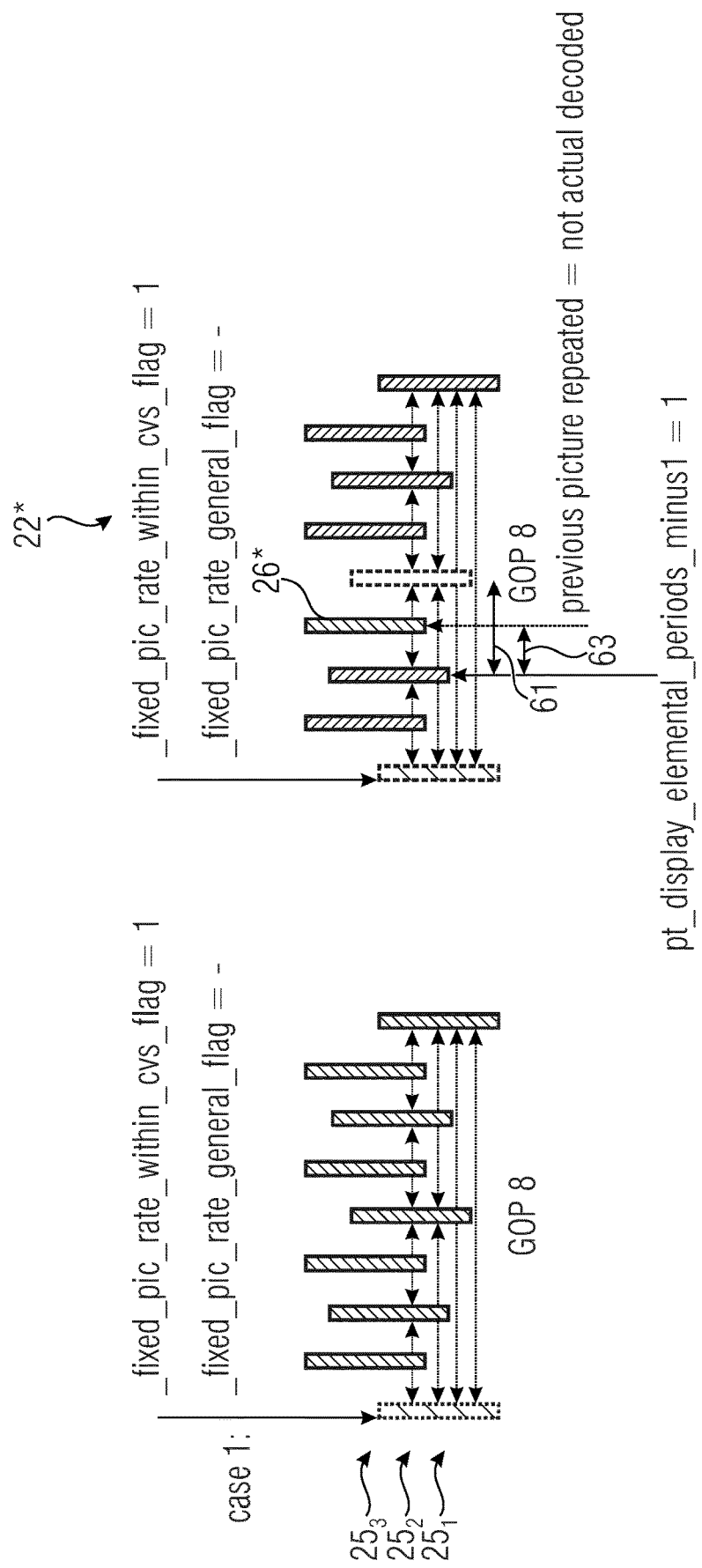
Figure 9:
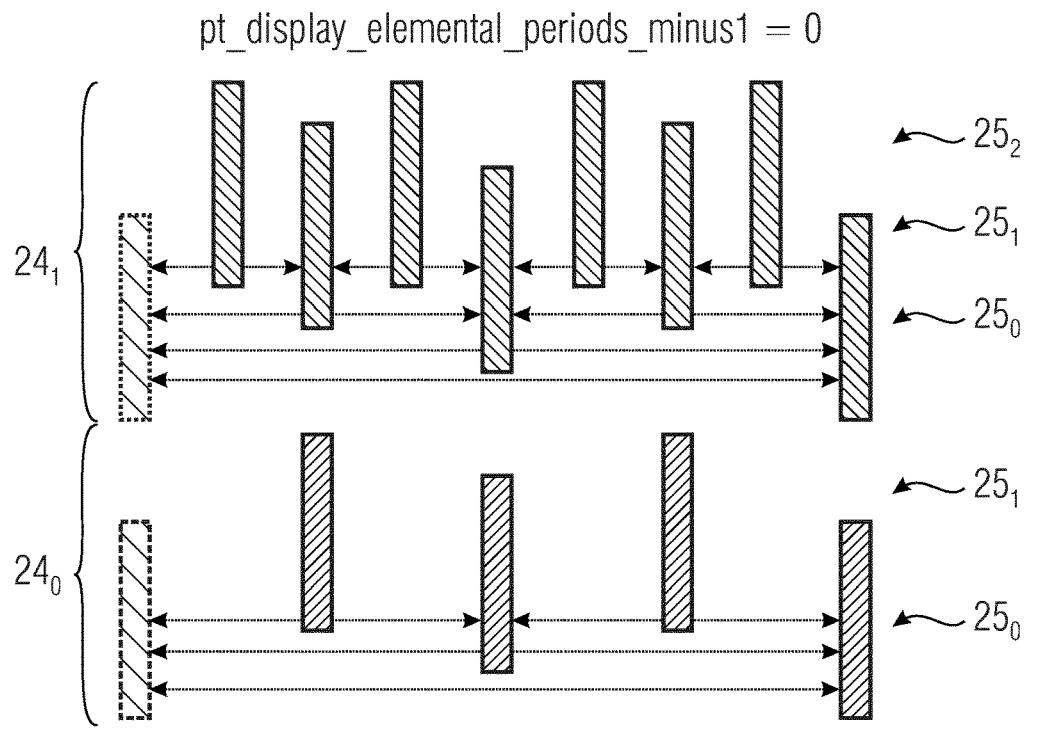
Figure 10:
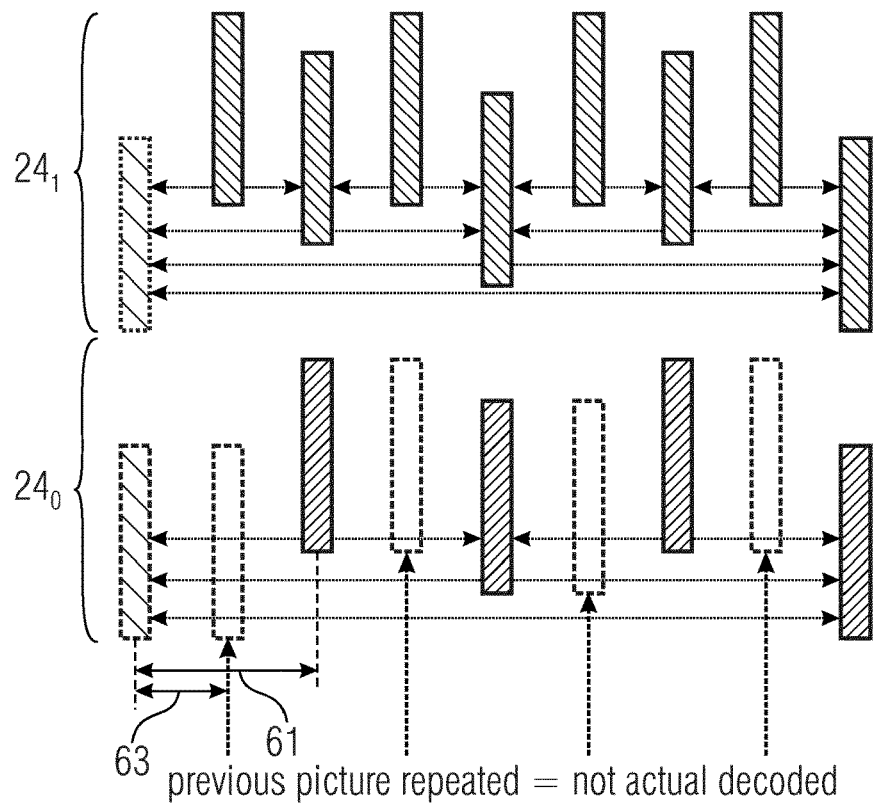
Figure 11:
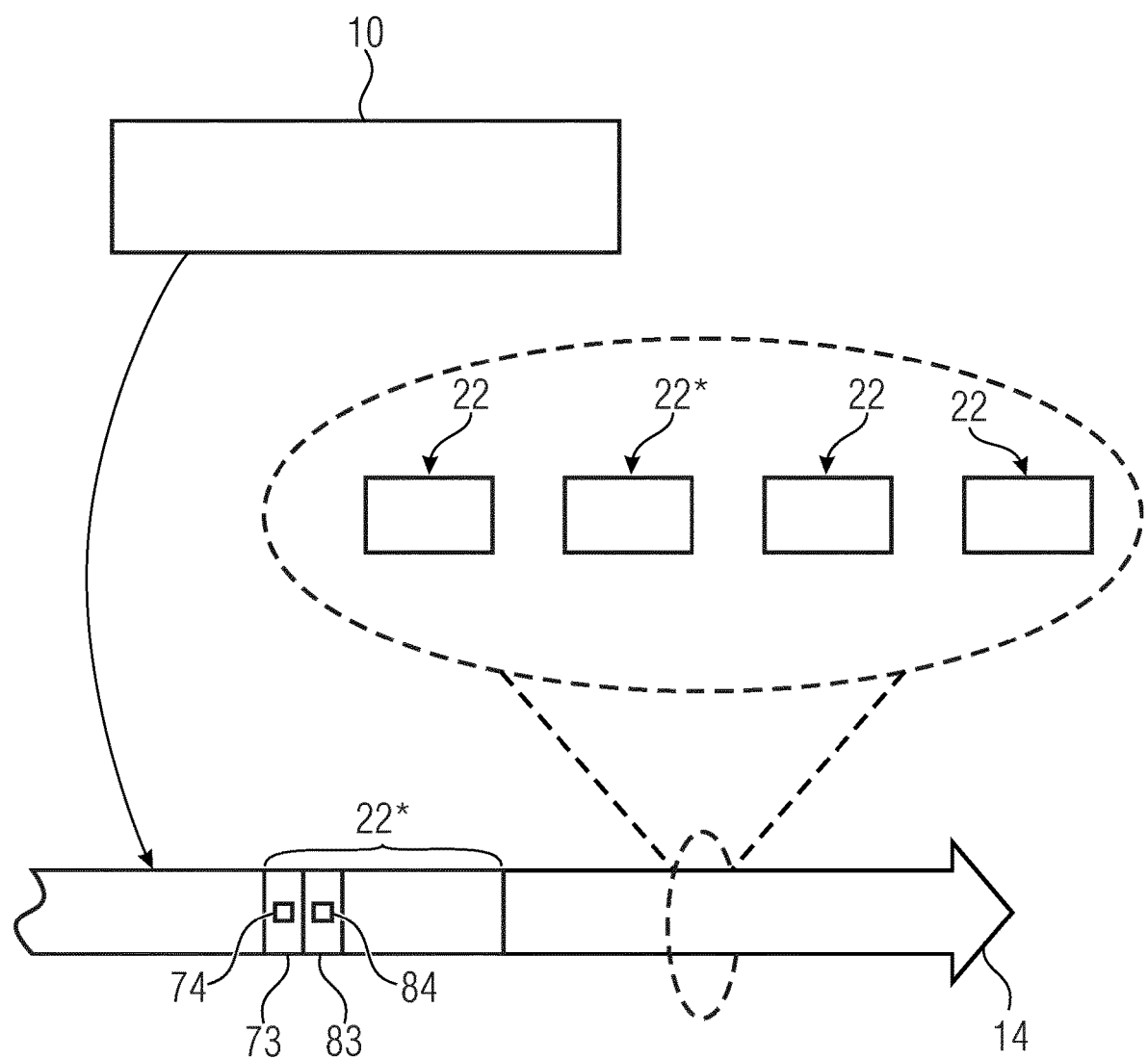
Figure 12:
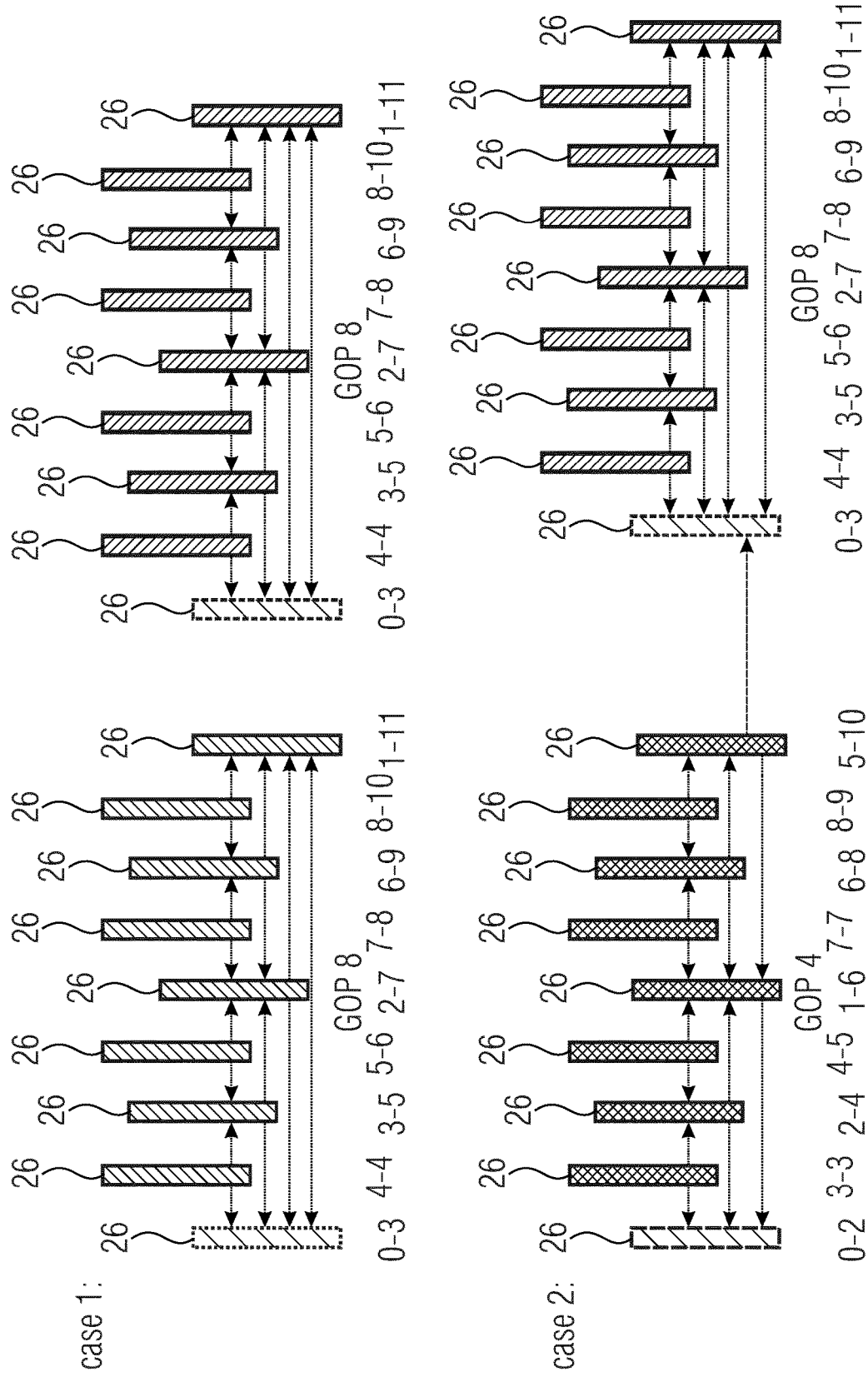
Figure 13:
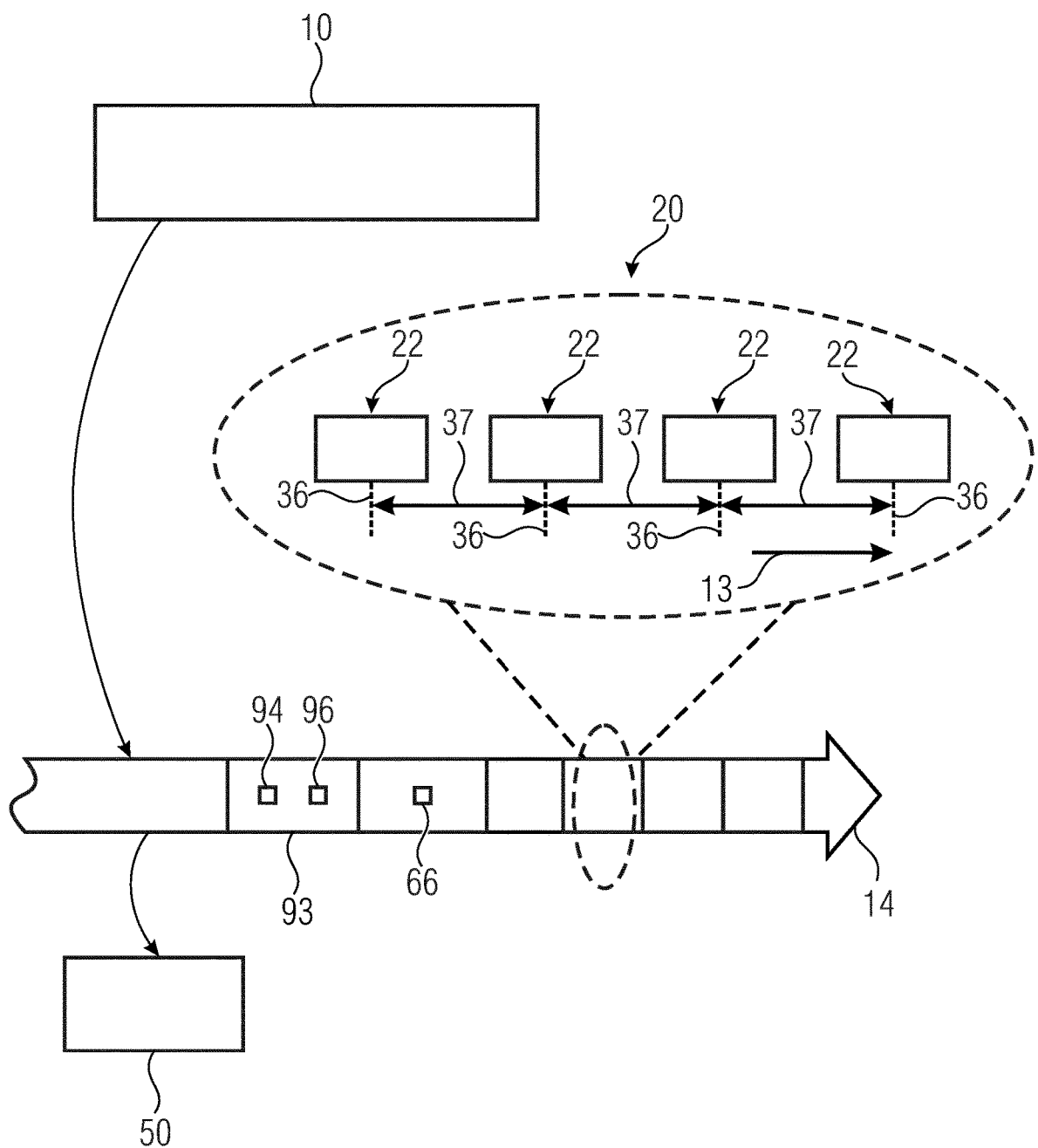
Figure 14:
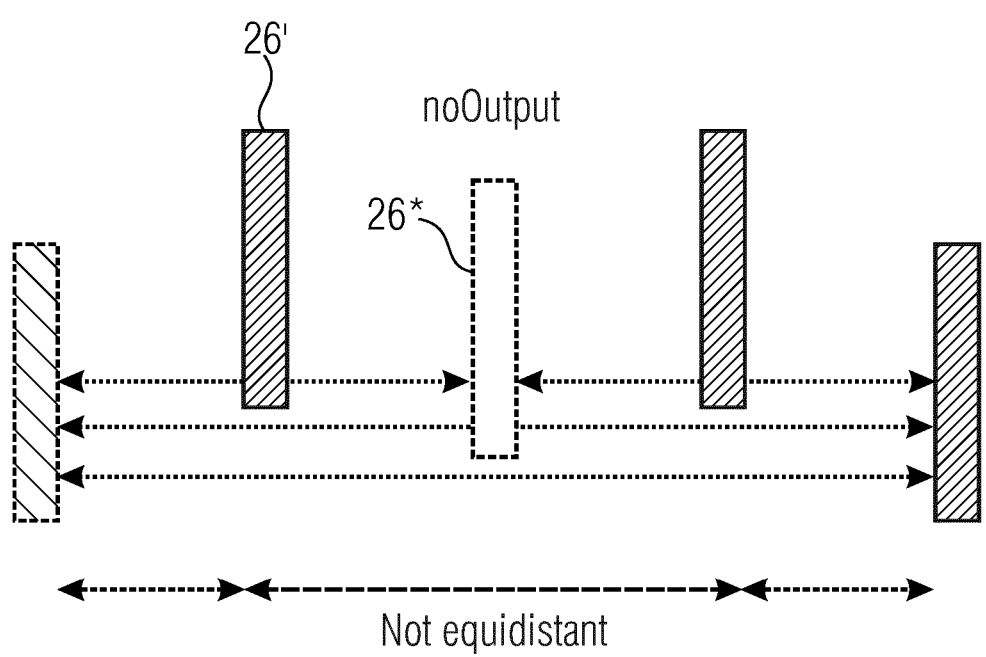

Embodiments and advantageous implementations of the present disclosure are described in more detail below with respect to the figures, among which:

FIG. 1 illustrates an encoder, a decoder and a video bitstream according to embodiments, FIG. 2 illustrates an example of two layers of a bitstream, the two layers having different IRAP periods, FIG. 3 illustrates an example of random accessing a two layer video bitstream without an end of sequence indication, FIG. 4 illustrates an example of a coded video sequence having aligned end of sequence indications according to embodiments of the first aspect, FIG. 5 illustrates examples of dependent layers according to embodiments of the first aspect, FIG. 6 illustrates examples of temporal sublayers, FIG. 7 illustrates examples of splicing of bitstreams, FIG. 8 illustrates an example of frame repetition, FIG. 9 illustrates an example of a bitstream having two layers with different frame rates, FIG. 10 illustrates an example of a two-layer bitstream with repetition of output frames in one layer, FIG. 11 illustrates an encoder and a video bitstream according to an embodiment of sub-aspect 2.3, FIG. 12 illustrates an example regarding GOP sizes and DPB parameters and reordering, FIG. 13 illustrates an example of an encoder, a decoder and a video bitstream according to embodiments of the sub-aspect 2.5, FIG. 14 illustrates an example of a bitstream comprising a picture which is not to be output.

In the following, embodiments are discussed in detail, however, it should be appreciated that the embodiments provide many applicable concepts that can be embodied in a wide variety of video coding concepts. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

The detailed description of embodiments of the disclosed concepts starts with the description of examples of an encoder, a decoder, and a video bitstream which examples provide a framework into which embodiments of the present invention may be built in. Thereinafter, the description of embodiments of the concept of the present invention is presented along with a description as to how such concepts could be built into the encoder, the decoder of FIG. 1. Although, the embodiments described with respect to the subsequent FIG. 2 and following may also be used to form an encoder and a decoder not operating according to the framework described with respect to FIG. 1. It is further noted that the encoder and the decoder may be implemented separately from each other, although they are jointly described in FIG. 1 for illustrative purpose. It is further noted, that the encoder and the decoder may be combined within one apparatus, or that one of the two may be implemented to be part of the other one. Also, some of the embodiments of the invention are described with reference to FIG. 1.

0. Encoder 10, Decoder 50 and Video Bitstream 14 According to FIG. 1

FIG. 1 illustrates examples of an encoder 10 and a decoder 50. Encoder 10 (which may also be referred to as apparatus for encoding) encodes a video sequence 12 into a video bitstream 14 (which may also be referred to as bitstream, data stream, video data stream, or stream). The video sequence 12 includes a sequence of pictures 13, the pictures 13 being arranged in a presentation order or picture order 17. In other words, each of the pictures 13 may represent a frame of the video sequence 12 and may be associated with a time instant of a presentation order of the video sequence 12. On the basis of the video sequence 12, encoder 10 may encode, into the video bitstream 14, a coded video sequence 20. Encoder 10 may form the coded video sequence 20 in the form of access units 22, each of the access units 22 having encoded thereinto video data belonging to a common time instant. In other words, each of the access units 22 may have encoded thereinto one of the frames of the video sequence 12. Encoder 10 encodes the coded video sequence 20 into video bitstream 14 according to a coding order 19, which may differ from the picture order 17 of the video sequence 12.

Encoder 10 may encode the coded video sequence 20 into one or more layers. That is, video bitstream 14 may be a single layered or a multi-layered video bitstream comprising one or more layers. Each of the access units 22 includes one or more coded pictures 26 (e.g., pictures $26_0$, $26_1$ in FIG. 1, wherein apostrophes and stars are used for referencing specific ones, and subscript indices indicate the layer to which the pictures belong). It is noted, that in the following, coded pictures may be referred to simply as pictures. Each of the pictures 26 belongs to one of layers 24, e.g., layer $24_0$, $24_1$ of FIG. 1, of the coded video sequence. In FIG. 1, an exemplarily number of two layers is shown, namely a first layer $24_1$ and a second layer $24_0$. In embodiments according to the disclosed concepts, the coded video sequence 20 and the video bitstream 14 do not necessarily include multiple layers, but may include 1, 2 or more layers. In the example of FIG. 1, each of the access units 22 includes a coded picture $26_1$ of the first layer $24_1$ and a coded picture $26_0$ for the second layer $24_0$. It is noted, however, that each of the access units 22, but not necessarily, may include a coded picture for each of the layers of the coded video sequence 20. For example, layers $24_0$, $24_1$ may have different framerates (or picture rates) and/or may include pictures for complementary subsets of access units of the access units 22.

As mentioned before, the pictures $26_0$, $26_1$ of one of the access units represent image content of the same time instant. For example, pictures $26_0$, $26_1$ of the same access unit 22 may represent the same image content at different qualities, e.g., resolution or fidelity. In other words, layer $24_0$ may represent a first version of the coded video sequence 20 and a layer $24_1$ may represent a second version of the coded video sequence 20. Thus, a decoder, such as decoder 50, or an extractor, may select between different versions of the coded video sequence 20 to be decoded or extracted from the video bitstream 14. For example, layer $24_0$ may be decoded independently from further layers of the coded video sequence, providing for a decoded video sequence of a first quality, while a joint decoding of the first layer $24_1$ and the second layer $24_0$ may provide for a decoded video sequence of a second quality, which is higher than the first quality. For example, the first layer $24_1$ may be encoded in dependence on the second layer $24_0$. In other words, the second layer $24_0$ may be a reference layer for the first layer $24_1$. For example, in this scenario, the first layer $24_1$ may be referred to as enhancement layer and the second layer $24_0$ may be referred to as a base layer. Pictures $26_0$ may have a smaller picture size, an equal picture size or a larger picture size than the pictures $26_1$. For example, the picture size may refer to a number of samples in a two dimensional array of a picture. It is noted that pictures $26_0$, $26_1$ do not necessarily have to represent an equal image content, but, for example, pictures $26_1$ may represent an excerpt of the image content of pictures $26_0$. For example, in some scenarios, different layers of the video bitstream 14 may include different subpictures of pictures coded into the video bitstream, which may be encoded independently from each other. Thus, in further examples, layers $24_0$, $24_1$ may be encoded into the video bitstream 14 independently from each other.

Encoder 10 encodes the access units 22 into bitstream portions 16 of the video bitstream 14. For example, each of the access units 22 may be encoded into one or more bitstream portions 16. For example, a picture 26 may be subdivided into tiles of slices, and each of the slices may be encoded into one bitstream portion 16. Bitstream portions 16, into which the pictures 26 are encoded may be referred to as video coded layer (VCL) NAL units. The video bitstream 14 may further include non-VCL NAL units, e.g., bitstream portions 23, 29, into which descriptive data is coded. The descriptive data may provide information for decoding or information about the coded video sequence 20. Bitstream portions into which descriptive data is encoded may be associated with individual bitstream portions, e.g. they may refer to individual slices, or they may be associated with one of the pictures 26, or one of the access units 22, or may be associated with a sequence of access units, i.e., relate to the coded video sequence 20. It is noted that the video 12 may be coded into a sequence of coded video sequences 20.

Decoder 50 (which may also be referred to as apparatus for decoding) decodes the video bitstream 14 so as to obtain a decoded video sequence 51. It is noted that the video bitstream 14 provided to decoder 50 does not necessarily correspond to the video bitstream 14 provided by an encoder, but may have been extracted from a video bitstream provided by an encoder so that the video bitstream decoded by decoder 50 may be a sub-bitstream of a video bitstream encoded by an encoder such as encoder 10. As mentioned before, decoder 50 may decode the entire coded video sequence 20 coded into video data stream 14, or may decode a portion thereof, e.g., a subset of layers of the coded video sequence 20 and/or a temporal subset of the coded video sequence 20 (i.e., a video sequence having a lower framerate than the maximum framerate provided by the coded video sequence 20). Thus, the decoded video sequence 51 does not necessarily correspond to the video sequence 12 encoded by encoder 10. It is also noted that the decoded video sequence 51 may further differ from the video sequence 12 due to coding losses, such as quantization loss. The decoded video sequence 51 includes, for each of frames of the decoded video sequence, one or more decoded pictures 53 being decoded from respective layers of the coded video sequence 20. In other words, in examples, the decoded video sequence 51 may include one or more layers, similar as the coded video sequence 20. The decoded pictures 53 may be output according to an output order 18, which may in examples correspond to the picture order 17. However, the decoded video sequence 51 does not necessarily include all frames of the video sequence 12, and may also include multiple instances, i.e. repetitions, of one picture as will be elaborated in section 2.

The pictures 26 may be encoded using prediction tools for predicting the signal or the coefficients representing the picture in the video bitstream 14 from previously coded pictures. That is, encoder 10 may use the prediction tools for encoding a predetermined picture 26*, e.g. a picture which is currently to be encoded using previously encoded pictures. Correspondingly, decoder 50 may use the prediction tools for predicting a picture 26* to be currently decoded from previous decoded pictures. In the following description, a predetermined picture or block, e.g. the currently coded picture or block, will be referenced using the (*) in the reference sign. E.g., picture $26_1$* in FIG. 1 is considered as the currently coded picture, wherein the currently coded picture 26* may equivalently refer to the currently encoded picture encoded by encoder 10 and the currently decoded picture in the decoding process performed by decoder 50.

Prediction of a picture from other pictures of the coded video sequence 20 may also be referred to as inter-prediction. For example, picture $26_1$* may be encoded using temporal inter-prediction from picture $26_1$' which belongs to a different one of the access units 22 than picture $26_1$*. Thus, picture $26_1$* may include an intra-layer reference 32 to a picture $26_1$' belonging to the same layer but to another access unit than the picture $26_1$*. Additionally or alternatively, picture $26_1$* may optionally be predicted using inter-layer (inter-)prediction from a picture of another layer, e.g., a lower layer (lower by means of layer indices which may be associated with each of layers 24). For example, picture $26_1$* may include an inter-layer reference 34 to picture $26_0$' which belongs to the same access unit but to another layer. In other words, in FIG. 1, pictures $26_1$', $26_0$' may be examples of possible reference pictures for the currently coded picture $26_1$*. It is noted that prediction may be used for predicting coefficients of the pictures themselves, such as in the determination of transform coefficients signaled in the video bitstream 14, or may be used for prediction of syntax elements, which are used in the encoding of the pictures.

Embodiments described herein may be implemented in the context of versatile video coding (VVC) or other video codecs.

In the following, several concepts and embodiments will be described making reference to FIG. 1, and features described with respect to FIG. 1. It is pointed out that features described with respect to an encoder, a video bitstream, or a decoder shall be understood to be also a description of the others of these entities. For example, a feature which is described to be present in a video data stream shall be understood as a description of an encoder being configured to encode this feature into a video bitstream and a decoder or an extractor being configured to read the feature from the video bitstream. It is further pointed out that inference of information based on indications coded into the video bitstream may equally be performed on encoder and decoder side. It is further noted that the aspects described in the following sections may be combined with each other.

1. End of Sequence (EOS) Implications in Multilayer Bitstreams

This section describes embodiments according to the first aspect making reference to FIG. 1. Details described in section 0 may optionally apply to embodiments according to the first aspect.

According to embodiments of the first aspect, the video bitstream 40 is a multilayered video bitstream, for example, as illustrated in FIG. 1. As described in section 0, pictures 26 may be coded inter-layer prediction, so that, for decoding, information of another picture of the same layer is required. Alternatively or additionally, pictures may be encoded using inter-layer prediction so that, in decoding, information of a picture of another layer is required. In contrast, an independently coded picture, or random accessible picture, may be a picture which does not depend on pictures belonging to access units 22 different from its own access unit. In other words, an independently coded picture is encoded without using temporal inter-prediction. For example, an Intra Random Access Point (IRAP) picture may be an independently coded picture. Examples of IRAP pictures are Instantaneous Decoding Refresh (IDR) pictures and Clean Random Access (CRA) pictures. As mentioned in section 0, the coding order 19 does not necessarily correspond to the picture order and the presentation order (also referred to as output order). A picture which is dependently coded, depending on a preceding picture, preceding in coding order and presentation order may be referred to as a trailing picture. Another example of a dependently coded picture is a picture which depends on a picture of a previously coded access unit, but which dependently coded picture precedes the picture on which it is dependent in presentation order 19. Examples of such pictures may be Random Access Skipped Leading (RASL) pictures. A RASL picture may be associated with an independently coded picture, e.g. a CRA picture, on which it may depend, the independently coded picture preceding the RASL picture in coding order but following the RASL picture in presentation order. Further, the RASL picture may depend on (i.e. include references to) one or more further pictures, including one or more pictures preceding the associated independently coded (e.g. CRA) picture in coding order. In case that the independently coded picture is a coded video (layer) sequence start picture (e.g. because it is the first in the bitstream or it is the first after an end of sequence indication), what may imply that pictures preceding the independently coded picture in coded order are cleared from a buffer, RASL pictures may therefore be excluded from output, as they may be decoded incorrectly due to missing references.

The coded video sequence 21 may include, in each of layers 24, one or more coded layer video sequences. A coded layer video sequence may start with a coded layer video sequence start picture, e.g., an independently coded picture, and may include all pictures of the respective layers from the coded layer video sequence start picture until, in coding order 19, a following coded video layer sequence start picture, exclusive, or until the end of the coded layer video sequence. It is noted, that each of the layers 24 may have a different number and/or a different arrangement of coded layer video sequences. In other words, the coded layer video sequence start pictures of different layers are not necessarily aligned within the same access units.

FIG. 2 illustrates an example of two layers $24_0$, $24_1$ having a different period of IRAP pictures.

When a bitstream contains multiple layers, it is not necessary that the IRAP pictures in each layer are aligned, e.g. a lower layer L0, e.g. layer $24_0$ of FIG. 1, may have more frequent IRAP pictures than a higher dependent layer L1, e.g. layer $24_1$ of FIG. 1. While the CLVS 21' of the lower layer stops at each of such IRAP pictures, the CLVS of the higher layer may go on as, e.g. by having IDR AUs at lower layer and not at higher, or shown in FIG. 2 by means of end of sequence (EOS) NAL units.

There exist cases, wherein a bitstream needs to contain so-called end-of-sequence (EOS) NAL units 41 before the start of a new CLVS 21" (at a CLVSS picture $26_0$* which is a CRA in FIG. 2) that stop the first CLVS0 21'. Subsequently, the CLVSS picture (CRA) has NoOutputBeforeRecoveryFlag equal to 1 and the RASL picture $26_0$', which cannot be correctly reconstructed because of missing references from before the CLVSS picture $26_0$*, is omitted from output. However, when the other pictures in the AU 22' of the RASL picture $26_0$' use the RASL as reference for prediction (e.g. sample or syntax such as MVs) the other picture (L1 Trail in FIG. 2, e.g. picture $26_1$') would also be reconstructed incorrectly and subsequently output.

According to a first embodiment of the first aspect, encoder 10 is configured to encode non-RASL pictures, e.g., picture $26_1$' in FIG. 2, among pictures $26_1$ of the first layer $24_1$, which non-RASL pictures are temporarily aligned to RASL pictures of the second layer $24_0$, e.g., picture $26_0$' in FIG. 2, in a manner without prediction from the RASL pictures $26_0$' of the second layer $24_0$. Further, encoder 10 encodes RASL picture of the first layer $24_1$, which RASL pictures are temporarily aligned to RASL pictures of the second layer $24_0$, using the RASL pictures of the second layer $24_0$ as inter-layer prediction reference for the RASL pictures of the first layer $24_1$. For example, referring to FIG. 2, assuming that picture $26_1$' would be a RASL picture, encoder 10 would encode picture $26_1$', e.g., referred to as first RASL picture using the RASL picture $26_0$' of the second layer $24_0$ as inter-layer prediction reference. The RASL picture $26_0$' of the second layer $24_0$ may be referred to as second RASL picture. In the case shown in FIG. 2, in which picture $26_1$' is a non RASL picture, encoder 10 according to the first embodiment encodes the first RASL picture $26_1$' in a manner without prediction from the third RASL picture $26_0$'.

Using a picture's inter-layer prediction reference may signify to consider same picture in recruiting previous encoded pictures for forming reference picture lists for inter-predicting currently encoded pictures in terms of a vector based inter-prediction and/or motion vector prediction. Optionally, using a picture as inter-layer prediction reference may additionally signify to consider same picture, as being referenced in the reference picture list by way of reference indices for inter-predicted blocks of current encoded pictures.

Encoding a picture without prediction from a specific picture may signify to avoid to the specific picture in recruiting previous encoded pictures for forming reference picture lists for inter-predicting currently coded picture in terms of vector based inter-prediction and/or motion vector prediction and/or avoiding the specific picture as being referenced in the reference picture lists of currently encoded pictures by way of reference indices for inter-predicted blocks of the currently encoded pictures.

In other words, according to the first embodiment of the first aspect, RASL pictures are forbidden as inter-layer-reference pictures when the referencing picture is not a RASL picture, thereby, the L1 trailing picture in the same access unit as the RASL picture can be reconstructed correctly. The constraints discussed here mean that the RASL pictures are not used as reference by not having them either present in the RPL (reference picture list) or having them not selected from the RPL; i.e. they might be inactive references in the RPL or references that are not used.

However, this constraint is unnecessarily strict and there are cases where this might be not an issue, e.g. there is no EOS NUT as illustrated in FIG. 3.

FIG. 3 illustrates an example of a random access picture without a proceeding EOS indication.

In such a case, the said reference from L1 Trail to L0 RASL becomes a problem only when tuning in (random accessing) at the CRA position 22*, but the decoder would skip all picture in enhancement layers L1 anyway until an IRAP picture is encountered in the respective enhancement layer.

In the example of FIG. 3, picture $26_0$* of the second layer $24_0$ is a CRA picture, e.g., an independently coded picture on which one or more RASL pictures may depend. In the example of FIG. 3, the picture of the second layer $24_0$, which picture precedes the CRA picture $26_0$* in coding order 19, in contrast to FIG. 2, does not have an end of sequence indication 41. Nevertheless, the CRA picture $26_0$* may be a coded layer video sequence start picture, e.g., it may be indicated, e.g., in this case, no RASL pictures depending on CRA picture $26_0$*, such as RASL picture $26_0$' are indicated for output. For example, the CRA picture $26_0$' may be a coded layer video sequence start picture, if the below mentioned no output before recovery slack is set to 1 and the below mentioned HandleCraAsClvsStartFlag is set to 1.

According to a second embodiment of the first aspect, encoder 10 may use RASL pictures of the second layer $24_0$, suggests RASL picture $26_0$' as inter-layer prediction reference pictures for pictures of the first layer $24_1$ temporarily aligned, e.g., part of the same access units, to the RASL pictures of the second layer $24_0$, if the pictures of the first layer are RASL pictures, and if the CRA picture $26_0$' to which the RASL pictures $26_0$' of the second layer $24_0$ are associated is a coded layer video sequence start picture. In other words, in the example of FIG. 3, picture $26_1$' is temporally aligned with picture $26_0$', i.e., the two pictures are within the same access unit 22'. Picture $26_0$' of the second layer $24_0$ is a RASL picture associated to the CRA picture $26_0$*. According to the second embodiment, encoder 10 uses picture $26_0$' as an inter-layer reference picture for picture $26_1$', if picture $26_1$' is a RASL picture. If picture $26_1$' is a non-RASL picture, encoder 10 uses picture $26_0$' as a inter-layer reference picture for picture $26_1$', if the CRA picture $26_0$* does not form a start of the coded layer video sequence 21". Otherwise, that is, if picture $26_1$' is a non-RASL picture and the CRA picture $26_0$* forms a start of the coded layer video sequence 21", encoder 10 encodes picture $26_1$' does not picture $26_0$' as an inter-layer reference picture. If CRA picture $26_0$* forms a start of the coded layer video sequence 21", previous pictures in coding order 19 may be unavailable, so that RASL picture $26_0$' may be decoded incorrectly.

In other words, according to examples of the second embodiment of the first aspect, the first embodiment above (RASL pictures are forbidden as inter-layer-reference pictures when the referencing picture is not a RASL picture) is subject to the following conditions:

RASL pictures associated with a CRA that follows a EOS NAL unit (cf. FIG. 2)

RASL pictures associated with a CRA for which NoOutputBeforeRecoveryFlag is set to 1 by external means setting HandleCraAsClvsStartFlag to 1 (cf. FIG. 3).

The latter case is the case where the decoder is informed by an API that any CRA is treated as a start of a new CLVS and therefore the treatment is the same as when there is an EOS NAL unit without the presence of such a NAL unit.

In other words, the constraint (disallowing RASL as ILRP reference picture) can be conditioned on the associated CRA having NoOutputBeforeRecoveryFlag set equal to 1 (either way: presence of EOS NAL or external means) as follows:

The following constraints apply for the picture referred to by each ILRP entry, when present, in RefPicList[0] or RefPicList[1] of a slice of the current picture:
The picture shall be in the same AU as the current picture.
The picture shall be present in the DPB.
The picture shall have nuh_layer_id refPicLayerId less than the nuh_layer_id of the current picture.
The picture shall not be a RASL picture when the associated CRA has NoOutputBeforeRecoveryFlag set to 1 and the current picture is not a RASL.
Either of the following constraints applies:
The picture shall be an IRAP picture.
The picture shall have TemporalId less than or equal to Max(0, vps_max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively.

FIG. 4 illustrates an example of the coded video sequence 20 as it may be encoded into the video data stream 14. The coded video sequence 20 comprises the first layer $24_0$ and the second layer $24_1$, the second layer being a reference layer of the first layer. In access units 22' the second layer $24_0$ has an end of sequence indication 41, which indicates that access units 22' is the last access unit in coding order 19 of a coded layer video sequence $21_0$' of the second layer $24_0$, and that in access unit 22'' which follows the access unit 22' in coding order 19 a new coded layer video sequence $21_0$'' of the second layer $24_0$ starts.

According to a third embodiment of the first aspect, encoder 10 is configured for inserting in each of such access units 22' having an end of sequence indication 41 (also referred to end of sequence identifier), into the first layer $24_1$ and end of sequence indication 41, as illustrated in FIG. 4.

Consequently, as the first layer $24_1$ has an end of sequence indication 41 in access units 22', an end of a coded layer video sequence $21_1$' of the first layer 24' ends with access unit 22', and consequently in the same access unit as the coded layer video sequence $21_0$' of the second layer $24_0$. According, in layer $24_1$, a new coded layer video sequence $21_1$'' starts with access units 22'', synchronous with the start of the next coded layer video sequence $21_0$'' of the second layer $24_0$. Due to the end of sequence indication 41 in the first layer $24_1$, a RASL picture in the next coded layer video sequence $21_1$'' would not be, such avoiding the above-described problem with non-synchronous coded layer video sequence boundaries.

An alternative to the third embodiment is described with respect to FIG. 5, which illustrates a video bitstream in accordance with the scenario described with respect to FIG. 4. However, according to this embodiment, encoder 10 does not necessarily insert (in examples it may do so) an end of sequence indication 41 in the first layer $24_1$ at access unit 22'. According to the alternative third embodiment, encoder 10 is configured for encoding, within a next access unit 22'', 22''', which follow the access unit 22' having the end of sequence indication 41 in the second layer $24_0$, into which access unit 22'', 22''' a picture $26_1$'' is to be encoded, the picture $26_1$'' to be encoded into the first layer $24_1$ using decoder refresh and with no output of leading pictures. In other words, the next access unit 22'', 22''' is an access unit out of access units which follow the access units 22' in coding order 19 and into which a picture of the first layer is to be encoded, and out of these access units, the next access unit 22'', 22''' is the one which follows the access unit 22' closest. In FIG. 5, two examples of the first layer are illustrated, which are referenced using reference signs $24_1$ and layer $24_2$. It is noted, that these two examples of the first layer are shown together in FIG. 5 for illustrative purpose but may represent independent examples. Thus, in examples, one or more of such first layers may be present in the coded video sequence 20. In layer $24_2$, the next access unit is access unit 22''', into which picture $26_2$''' is to be coded (as access unit 22'' does not have a picture in the first layer), wherein in layer $24_1$, the next access unit is 22'', into which picture $26_1$'' is to be coded.

By encoding the picture $26_1$'', $26_1$''' of the first layer $24_1$, $24_2$ which is coded dependently to the second layer $24_0$ using decoding refresh and with no output of leading pictures, results in the fact that a picture of the first layer $24_1$, $24_2$ which depends on a picture of the second layer $24_0$ which is a RASL picture, as it may in examples be the case for picture $26_0$''', are not to be presented as they may also be RASL pictures.

Encoding the picture $26_1$'', $26_1$''' using decoding refresh may, for example signify, that the picture $26_1$'', $26_1$''' is encoded without reference to a picture of an access unit different than the access unit, to which the picture $26_1$'', $26_1$''' belongs, i.e. access unit 22'', 22''', respectively, e.g. the picture $26_1$'', $26_1$''' may be an IDR or CRA picture. The term "leading pictures" of the picture $26_1$'', $26_1$''' may denote pictures following the picture $26_1$'', $26_1$''' in coding order 19 but preceding the picture $26_1$'', $26_2$''' in presentation order 18, which pictures depend on (i.e. include references to) pictures preceding the picture $26_1$'', $26_2$''' in coding order 19. An example of a leading picture may be a RASL picture. Thus, encoding the picture $26_1$'', $26_1$''' with no output of leading pictures may, for example signify, that a picture in the first layer $24_1$, $24_2$ following the picture $26_1$'', $26_2$''' in coding order 19 but preceding the picture $26_1$'', $26_2$''' in presentation order does not exist (e.g. there is no RASL picture), or that it is indicated as not to be output. In other words, according to examples of the alternative third embodiment, encoder 10 is configured for encoding the first layer so that, the picture $26_1$'' to be encoded into the first layer $24_1$ within the next access unit 22'', 22''' is a coded layer video sequence start picture.

For example, encoding the picture $26_1$'', $26_1$''' as IDR may imply that no leading pictures, e.g. RASL pictures, following the picture $26_1$'', $26_1$''' in coding order exist in the first layer $24_1$, $24_2$. In other words, for example, picture $26_1$'' being a IDR picture may prohibit picture $26_1$''' being a leading picture, and thus also prohibiting picture $26_1$''' to have an interlayer reference to a RASL picture, such as, e.g. reference between picture $26_1$' and $26_0$' in FIG. 3. Thus, one example of encoding the picture $26_1$'', $26_1$''' using decoding refresh and with no output of leading pictures is encoding the picture $26_1$'', $26_1$''' as IDR.

Alternatively, the picture $26_1$'', $26_1$''' may be encoded as CRA, and no output of leading pictures may, for example, be accomplished using an end of sequence indication 41 in the access unit 22' in the first layer $24_1$, $24_2$. In this case, in examples, a leading picture following the picture $26_1$'', $26_1$''' in coding order may exist in the first layer $24_1$, $24_2$, but may be excluded from output, so that an incorrect decoding may not come into effect. Thus, even in a case in which picture $26_1$''' of layer $24_1$ depends on picture $26_0$''' of layer $24_0$ and picture $26_0$''' is a RASL picture, picture $26_0$''' is not output.

Compared to the constraint of the first alternative of the third embodiment explained with respect to FIG. 4, the second alternative examples with respect to FIG. 5 has the advantage that encoder 10 does not necessarily have to insert the end of sequence indication 41 in the first layer $24_1$.

In other words, according to examples of the third embodiment, it is a bitstream constraint that when a layer k dependent on a layer l and layer l contains an EOS NAL unit, layer k also contains an EOS NAL at the same position or the next AU must contain a CLVSS picture for layer k (e.g. IDR).

2. Picture Output Timing Aspects

This section describes embodiments according to the second aspect, which aspect includes first to six sub-aspects. Embodiments according to the second aspect are described making reference to FIG. 1, details and features of which may optionally be included in embodiments according to the second aspect. Also, details described in section1 may optionally apply to embodiments of the second aspect, e.g. details regarding coding types of pictures, dependencies between pictures, coded video layer sequences, etc.

As described with respect to FIG. 1, decoder 50 decodes the video bitstream 14, or a portion thereof so as to provide the decoded video sequence 51. Decoder 50 may provide the decoded picture 53 of the decoded video sequence 51 in a decoded picture buffer (DPB). Some embodiments according to the second aspect may relate to an output timing of the decoded pictures 53 from the decoded picture buffer, from which the decoded pictures 53 may, for example, be provided to a display for presentation. Decoder 50 may provide the decoded pictures 53 to the decoded picture buffer according to the presentation order 18. As described with respect to FIG. 1, decoder 50 does not necessarily have to decode and/or output all pictures of the video bitstream 14, but may decode and/or output a subset of the pictures encoded into video bitstream 14, which subset of pictures may be defined by means of layers to which the pictures are associated and/or by means of definitions of temporal subsets of the pictures. Temporal subsets may be defined by means of temporal layers, as described with respect to FIG. 6.

FIG. 6 illustrates examples of temporal layers of a coded video sequence 20. FIG. 6 illustrates a layer $24_0$ comprising pictures 26 of a first temporal sublayer $25_0$. A further layer $24_1$ comprises pictures of a second temporal layer $25_1$. The first temporal sublayer $25_0$ and the second temporal sublayer $25_1$ may have an equal framerate, as illustrated in FIG. 6, but pictures of the first temporal sublayer $25_0$ may belong to different access units 22 than the pictures of the second temporal sublayer $25_1$, that is, the pictures of the first temporal sublayer $25_0$ may belong to different time instants than the pictures of the second temporal sublayer $25_1$. It is noted that in FIG. 6, pictures 26 are arranged according to the presentation order 18 rather than in coding order 19. FIG. 6 illustrates a further example of layers, namely layer $24_2$ which includes pictures for each of the first temporal sublayer $25_0$ and the second temporal sublayer $25_1$. Consequently, layer $24_2$ has a higher framerate than layers $24_0$ and $24_1$. It is noted that the combination of layers illustrated in FIG. 6 is an illustrative example, and that the coded video sequence may include any combination of layers, each of which may include one or more temporal sublayers. Consequently, each of the access units 22 may include pictures of one or more of the layers 24.

The temporal sublayers may have a hierarchical order, which may, for example, be defined by means of indexes associated with the temporal sublayers. For example, the second temporal sublayer $25_1$ may be higher in hierarchical order than the first temporal sublayer $25_0$.

Decoder 50 may select one or more of the temporal sublayers included in video bitstream 14 for decoding, for example, by means of selecting a maximum temporal sublayer for decoding. That is, decoder may decode all temporal sublayers which are equal to or lower than in the hierarchical order to a maximum temporal sublayer.

For example, decoder 50 may receive an instruction which indicates up to which temporal sublayer video bitstream 14 is to be decoded. In other examples, decoder 50 may determine the maximum temporal sublayer to be decoded on its own. In other words, the above-mentioned temporal subset of pictures 26 to be decoded by decoder 50 may be defined by means of a selection of a maximum temporal sublayer to be decoded.

As mentioned above, the subset of pictures 26 to be decoded may further be defined by means of selecting a subset of layers of the layers 24 included in the video bitstream 14 for decoding. Video bitstream 14 may provide several choices for decodable bitstreams. For example, a single layer of video bitstream 14 may represent a decodable bitstream, which may be decodable by decoder 50 independently of further layers. Alternatively, a combination of layers, or all layers, of video bitstream 14 may represent a decodable bitstream and may be selected for decoding. For example, video bitstream 14 may include an OLS indication, for example, a descriptive data 23 of video bitstream 14. The OLS indication may indicate one or more output layer sets (OLSs). Each OLS may indicate one or more of the layers 24 of the video bitstream 14 as belonging to the OLS. In other words, an OLS may include one or more or all of the layers 24. In examples, one or more or all of the layers of an OLS may be indicated as output layers of the OLS. An OLS may optionally further include non-output layers. For example, in the example of quality scalable bitstreams, a reference layer of an output layer of the OLS may be included in the OLS, because the output layer, which references the reference layer may require the reference layer for being decoded, although, the reference layer itself does not necessarily have to be an output layer.

Decoder 50 may select an OLS of the OLSs indicated in the OLS indication of the video bitstream 14 for decoding, for example, the basis of an instruction provided by external means. In other examples, decoder 50 may select the OLS to be decoded on its own. Consequently, the bitstream to be decoded may be defined by means of selecting an OLS and a maximum temporal sublayer for decoding.

For example, decoder 50 may provide, for each picture, which is part of an output layer of the OLS to be decoded and which is included in the temporal subset of pictures, e.g., defined by means of a maximum temporal sublayer, a decoded picture 53 to the decoded picture buffer.

For example, the maximum temporal sublayer to be decoded may be represented by the below-described variable Htid, which may be either provided to or derived by a decoder 50.

Decoder 50 may output the decoded pictures 53 from the output buffer, i.e., the decoded picture buffer, at output times. In other words, decoder 50 may determine, for each of decoded pictures 53 an output time at which the respective picture is to be output. For example, the output times of the pictures may be provided to decoder 50 within the descriptive data of the video bitstream 14. For example, output times of the pictures may be provided by picture timing (PT) supplemental enhancement information (SEI) messages in the video bitstream 14. For example, the PT SEI messages may be provided for each of the access units 22. However, video bitstream 14 does not necessarily have to provide such output timing information. Rather, decoder 50 may determine the output timing for the pictures. For example, decoder 50 may derive the output timing of the pictures on its own, in cases, in which the bitstream decoded by decoder 50 has a constant output picture rate.

The current specification (e.g. of VVC) contains the following text to express that a bitstream has a constant output picture rate.

When Htid is equal to i and fixed_pic_rate_general_flag[i] is equal to 1 for a CVS containing picture n, and picture n is a picture that is output and is not the last picture in the bitstream (in output order) that is output, the value computed for DpbOutputElementalInterval[n] shall be equal to ClockTick*(elemental_duration_in_tc_minus1[i]+1), wherein ClockTick is as specified in Equation C.1 (using the value of ClockTick for the CVS containing picture n) when one of the following conditions is true for the following picture in output order nextPicInOutputOrder that is specified for use in Equation C.16:

picture nextPicInOutputOrder is in the same CVS as picture n.

picture nextPicInOutputOrder is in a different CVS and fixed_pic_rate_general_flag[i] is equal to 1 in the CVS containing picture nextPicInOutputOrder, the value of ClockTick is the same for both CVSs, and the value of elemental_duration_in_tc_minus1[i] is the same for both CVSs.

When Htid is equal to i and fixed_pic_rate_within_cvs_flag[i] is equal to 1 for a CVS containing picture n, and picture n is a picture that is output and is not the last picture in the CVS (in output order) that is output, the value computed for DpbOutputElementalInterval[n] shall be equal to ClockTick*(elemental_duration_in_tc_minus1[i]+1), wherein ClockTick is as specified in Equation C.1 (using the value of ClockTick for the CVS containing picture n) when the following picture in output order nextPicInOutputOrder that is specified for use in Equation C.16 is in the same CVS as picture n.

In summary, there are two control flags in the SPS (sequence parameter set, e.g. descriptive data associated with each of coded video sequences, e.g. coded video sequence (CVS) 20) as part of the hypothetical reference decoder (HRD) parameters. One control flag is fixed_pic_rate_within_cvs_flag, which indicates that within a CLVS (or CVS) all output pictures have an equidistant output time. The other control flag is fixed_pic_rate_general_flag, which indicates that the CVS starting with the first AU referring to the SPS that contains such a flag fulfills the equidistant output time between output picture also at the boundary of the CVS with the previous CVS as long as the value of ClockTick is the same for both CVSs, and the value of elemental_duration_in_tc_minus1 is the same.

Note that the signalling of whether the output rate is constant or not (fixed_pic_rate_within_cvs_flag) is given for each sublayers, e.g. temporal sublayers 25. That means that if the bitstream is generated allowing temporal scalability, this property (of constant picture rate) is signalled for each of the possible framerates that can be achieved when different number of sublayers is received. HTid refers to the Highest Temporal ID that is present in the bitstream, e.g. if originally the bitstream had 4 sublayers with temporal ids from 0 to 3 and the highest is dropped HTid becomes 2, and the parameters fixed_pic_rate_within_cvs_flag for HTid=2 is considered at the decoder to evaluate whether the output rate is constant or not.

The problem is that this solution requires modifying the SPS (e.g., fixed_pic_rate_general_flag) when splicing or editing involving CVS concatenation is carried out as indicated in FIG. 7.

FIG. 7 illustrates an example of an SPS modification, which may be a coded video sequence to a previously coded video sequence. The upper panel of FIG. 7 illustrates a first case, in which a splicing of a first video sequence $20_1$ and a second video sequence $20_2$ results in a bitstream, in which the picture rate, defined by a timing interval 71 between consecutive pictures, is constant at the boundary between the first video sequence $20_1$ and the second video sequence $20_2$. The lower panel of FIG. 7 illustrates a second case, in which the timing interval 71 and the boundary between the first video sequence $20_1$ and the second video sequence $20_2$ is not constant at the boundary.

It is noted that in FIG. 7 and the following FIGS. 8-10 and 12, pictures belonging to a common temporal sublayer 25 are illustrated at a common level with respect to their vertical position.

One of the benefits of indicating this information (e.g. fixed_pic_rate_general_flag) in the bitstream beyond signalling that a bitstream has a constant output framerate is that it also allows not using further more complex HRD parameters (or ignoring it), such as buffering period SEI messages or picture timing SEI message to derive the output times of the decoded pictures, but using the property of constant output framerate to derive the output times. That is, e.g., the PT SEI message and/or the BP SEI message may be omitted, i.e. not be present in video bitstream 14, or may be ignored by decoder 50 when deriving the output times for the decoded pictures.

One problem that the specification has to derive the output times in this fashion (e.g. without using PT and/or BP SEI messages) is that there is no way of determining the output time of the first AU in a CVS. Should one know the output time of the first AU of a CVS, one could easily determine the output times of further pictures when the flag indicates that the output times within a CVS are constant by simply adding the signalled delta (ClockTick*(elemental_duration_in_tc_minus1[i]+1)) to the previous output picture.

Note also, that the current specification indicates the following:

elemental_duration_in_tc_minus1[i] plus 1 (when present) specifies, when Htid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

When Htid is equal to i and fixed_pic_rate_general_flag[i] is equal to 1 for a CVS containing picture n, and picture n is a picture that is output and is not the last picture in the bitstream (in output order) that is output, the value of the variable DpbOutputElementalInterval[n] is specified by:

DpbOutputElementalInterval[*n*]=DpbOutputInterval[*n*]÷elementalOutputPeriods     (113)

where DpbOutputInterval[n] is specified in Equation C.16 and elementalOutputPeriods is specified as follows:

If a PT SEI message is present for picture n, elementalOutputPeriods is equal to the value of pt_display_elemental_periods_minus1+1.

Otherwise, elementalOutputPeriods is equal to 1.

This means that the constant output rate is not necessarily applicable to the pictures that are decoded but to the pictures that are displayed/output, i.e. it does not apply to DpbOutputInterval[n] but to DpbOutputElementalInterval[n]. In other words, the constant output rate includes repetitions of a frame, i.e. elementalOutputPeriods not being equal to 1 means that a certain picture is repeated. An example is given in FIG. 8.

FIG. 8 illustrates an example of a video bitstream, e.g., the example of the upper panel of FIG. 7, in which there is no picture in access units 22*. In such a situation, which may occur, for example, when a picture is lost during transmission or decoded incorrectly or be excluded from output or does not exist, the picture 26* of the previous access unit may be repeated so as to achieve a constant framerate. For example, there may be an indication in the access unit to which picture 26* belongs, which indication indicates that pictures of the access unit are to be repeated. For example, the indication may indicate the number of repetitions.

For example, DpbOutputInterval[n] may represent a duration of a time interval for an output of an access unit 22, i.e. of content belonging to a common time frame, such as a repeated output of a picture of the access unit, e.g. access unit output interval 61 in FIG. 8. In contrast, DpbOutputElementalInterval[n] may represent a time interval for an output of a single element, i.e. for a picture or for a repetition of the picture, e.g. picture output interval 63 in FIG. 8.

The syntax element used below for repetition (pt_display_elemental_periods_minus1) is not necessarily a frame repetition always. It might also be used for interlace content when a frame that was encoded and decoded as a frame is displayed as fields in the display step.

See the following specification text:

When sps_field_seq_flag is equal to 0 and fixed_pic_rate_within_cvs_flag[TemporalId] is equal to 1, a value of pt_display_elemental_periods_minus1 greater than 0 may be used to indicate a frame repetition period for displays that use a fixed flame refresh interval equal to DpbOutputElementalInterval[n] as given by Equation 113.

The following syntax example and semantics thereto are illustrative and shall ease the understanding:

|  | Descriptor |
|---|---|
| pic_timing( payloadSize ) { | |
|   pt_cpb_removal_delay_minus1[ bp_max_sublayers_minus1 ] | u(v) |
|   if( bp_alt_cpb_params_present_flag ) { | |
|     pt_cpb_alt_timing_info_present_flag | u(1) |
|     if( pt_cpb_alt_timing_info_present_flag ) { | |
|       if( bp_nal_hrd_params_present_flag ) { | |
|         for( i = ( bp_sublayer_initial_cpb_removal_delay_present_flag ? 0 : | |
|           bp_max_sublayers_minus1 ); i <= bp_max_sublayers_minus1; i++ ) { | |
|           for( j = 0; j < bp_cpb_cnt_minus1 + 1; j++ ) { | |
|             pt_nal_cpb_alt_initial_removal_delay_delta[ i ][ j ] | u(v) |
|             pt_nal_cpb_alt_initial_removal_offset_delta[ i ][ j ] | u(v) |
|           } | |
|           pt_nal_cpb_delay_offset[ i ] | u(v) |
|           pt_nal_dpb_delay_offset[ i ] | u(v) |
|         } | |
|       } | |
|       if( bp_vcl_hrd_params_present_flag ) { | |
|         for( i = ( bp_sublayer_initial_cpb_removal_delay_present_flag ? 0 : | |
|           bp_max_sublayers_minus1 ); i <= bp_max_sublayers_minus1; i++ ) { | |
|           for( j = 0; j < bp_cpb_cnt_minus1 + 1; j++ ) { | |
|             pt_vcl_cpb_alt_initial_removal_delay_delta[ i ][ j ] | u(v) |
|             pt_vcl_cpb_alt_initial_removal_offset_delta[ i ][ j ] | u(v) |
|           } | |
|           pt_vcl_cpb_delay_offset[ i ] | u(v) |
|           pt_vcl_dpb_delay_offset[ i ] | u(v) |
|         } | |
|       } | |
|     } | |
|   } | |
|   for( i = TemporalId; i < bp_max_sublayers_minus1; i++ ) { | |
|     pt_sublayer_delays_present_flag[ i ] | u(1) |
|     if( pt_sublayer_delays_present_flag[ i ] ) { | |
|       if( bp_cpb_removal_delay_deltas_present_flag ) | |
|         pt_cpb_removal_delay_delta_enabled_flag[ i ] | u(1) |
|       if( pt_cpb_removal_delay_delta_enabled_flag[ i ] ) | |
|         if( bp_num_cpb_removal_delay_deltas_minus1 > 0 ) | |
|           pt_cpb_removal_delay_delta_idx[ i ] | u(v) |
|         else | |
|           pt_cpb_removal_delay_minus1[ i ] | u(v) |
|     } | |
|   } | |
|   pt_dpb_output_delay | u(v) |
|   if( bp_decoding_unit_hrd_params_present_flag && | |
|     bp_du_dpb_params_in_pic_timing_sei_flag ) | |
|     pt_dpb_output_du_delay | u(v) |
|   if( bp_decoding_unit_hrd_params_present_flag && | |
|     bp_du_cpb_params_in_pic_timing_sei_flag ) { | |
|     pt_num_decoding_units_minus1 | ue(v) |
|     if( pt_num_decoding_units_minus1 > 0 ) { | |
|       pt_du_common_cpb_removal_delay_flag | u(1) |
|       if( pt_du_common_cpb_removal_delay_flag ) | |
|         for( i = TemporalId; i <= bp_max_sublayers_minus1; i++ ) | |
|           if( pt_sublayer_delays_present_flag[ i ] ) | |

|  | Descriptor |
|---|---|
|         pt_du_common_cpb_removal_delay_increment_minus1[ i ] | u(v) |
|         for( i = 0; i <= pt_num_decoding_units_minus1; i++ ) { |  |
|           pt_num_nalus_in_du_minus1[ i ] | ue(v) |
|           if( !pt_du_common_cpb_removal_delay_flag && |  |
|             i < pt_num_decoding_units_minus1 ) |  |
|             for( j = TemporalId; j <= bp_max_sublayers_minus1; j++ ) |  |
|               if( pt_sublayer_delays_present_flag[ j ] ) |  |
|                 pt_du_cpb_removal_delay_increment_minus1[ i ][ j ] | u(v) |
|         } |  |
|         } |  |
|     } |  |
|     if( bp_additional_concatenation_info_present_flag ) |  |
|         pt_delay_for_concatenation_ensured_flag | u(1) |
|     pt_display_elemental_periods_minus1 | u(4) |
| } |  |

The PT SEI message provides CPB removal delay and DPB output delay information for the AU associated with the SEI message.

If bp_nal_hrd_params_present_flag or bp_vcl_hrd_params_present_flag of the BP SEI message applicable for the current AU is equal to 1, the variable CpbDpbDelaysPresentFlag is set equal to 1. Otherwise, CpbDpbDelaysPresentFlag is set equal to 0.

The presence of PT SEI messages is specified as follows:
If CpbDpbDelaysPresentFlag is equal to 1, a PT SEI message shall be associated with the current AU.
Otherwise (CpbDpbDelaysPresentFlag is equal to 0), there shall not be a PT SEI message associated with the current AU.

The TemporalId in the PT SEI message syntax is the TemporalId of the SEI NAL unit containing the PT SEI message.

pt_cpb_removal_delay_minus1[i] plus 1 is used to calculate the number of clock ticks between the nominal CPB removal times of the AU associated with the PT SEI message and the preceding AU in decoding order that contains a BP SEI message when Htid is equal to i. This value is also used to calculate an earliest possible time of arrival of AU data into the CPB for the HSS. The length of pt_cpb_removal_delay_minus1[i] is bp_cpb_removal_delay_length_minus1+1 bits.

pt_cpb_alt_timing_info_present_flag equal to 1 specifies that the syntax elements pt_nal_cpb_alt_initial_removal_delay_delta[i][j], pt_nal_cpb_alt_initial_removal_offset_delta[i][j], pt_nal_cpb_delay_offset[i], pt_nal_dpb_delay_offset[i], pt_vel_cpb_alt_initial_removal_delay_delta[i][j], pt_vcl_cpb_alt_initial_removal_offset_delta[i][j], pt_vcl_cpb_delay_offset[i], and pt_vel_dpb_delay_offset[i] may be present in the PT SEI message. pt_cpb_alt_timing_infopresent_flag equal to 0 specifies that these syntax elements are not present in the PT SEI message. When the associated picture is a RASL picture, the value of pt_cpb_alt_timing_infopresent_flag shall be equal to 0.

NOTE 1—The value of pt_cpb_alt_timing_info_present_flag might be equal to 1 for more than one AU following an IRAP picture in decoding order. However, the alternative timing is only applied to the first AU that has pt_cpb_alt_timing_info_present_flag equal to 1 and follows the TRAP picture in decoding order.

pt_nal_cpb_alt_initial_removal_delay_delta[i][j] specifies the alternative initial CPB removal delay delta for the i-th sublayer for the j-th CPB for the NAL HRD in units of a 90 kHz clock. The length of pt_nal_cpb_alt_initial_removal_delay_delta[i][j] is bp_cpb_initial_removal_delay_length_minus1+1 bits.

When pt_cpb_alt_timing_info_present_flag is equal to 1 and pt_nal_cpb_alt_initial_removal_delay_delta[i][j] is not present for any value of i less than bp_max_sublayers_minus1, its value is inferred to be equal to 0.

pt_nal_cpb_alt_initial_removal_offset_delta[i][j] specifies the alternative initial CPB removal offset delta for the i-th sublayer for the j-th CPB for the NAL HRD in units of a 90 kHz clock. The length of pt_nal_cpb_alt_initial_removal_offset_delta[i][j] is bp_cpb_initial_removal_delay_length_minus1+1 bits.

When pt_cpb_alt_timing_info_present_flag is equal to 1 and pt_nal_cpb_alt_initial_removal_offset_delta[i][j] is not present for any value of i less than bp_max_sublayers_minus1, its value is inferred to be equal to 0.

pt_nal_cpb_delay_offset[i] specifies, for the i-th sublayer for the NAL HRD, an offset to be used in the derivation of the nominal CPB removal times of the AU associated with the PT SEI message and of the AUs following in decoding order, when the AU associated with the PT SEI message directly follows in decoding order the AU associated with the BP SEI message. The length of pt_nal_cpb_delay_offset[i] is bp_cpb_removal_delay_length_minus1+1 bits. When not present, the value of pt_nal_cpb_delay_offset[i] is inferred to be equal to 0.

pt_nal_dpb_delay_offset[i] specifies, for the i-th sublayer for the NAL HRD, an offset to be used in the derivation of the DPB output times of the IRAP AU associated with the BP SEI message when the AU associated with the PT SEI message directly follows in decoding order the IRAP AU associated with the BP SEI message. The length of pt_nal_dpb_delay_offset[i] is bp_dpb_output_delay_length_minus1+1 bits. When not present, the value of pt_nal_dpb_delay_offset[i] is inferred to be equal to 0.

pt_vcl_cpb_alt_initial_removal_delay_delta[i][j] specifies the alternative initial CPB removal delay delta for the i-th sublayer for the j-th CPB for the VCL HRD in units of a 90 kHz clock. The length of pt_vcl_cpb_alt_initial_removal_delay_delta[i][j] is bp_cpb_initial_removal_delay_length_minus1+1 bits.

When pt_cpb_alt_timing_info_present_flag is equal to 1 and pt_vcl_cpb_alt_initial_removal_delay_delta[i][j] is not present for any value of i less than bp_max_sublayers_minus1, its value is inferred to be equal to 0.

pt_vcl_cpb_alt_initial_removal_offset_delta[i][j] specifies the alternative initial CPB removal offset delta for the i-th sublayer for the j-th CPB for the VCL HRD in units of a 90 kHz clock. The length of pt_vcl_cpb_alt_initial_removal_offset_delta[i][j] is bp_cpb_initial_removal_delay_length_minus1+1 bits.

When pt_cpb_alt_timing_info_present_flag is equal to 1 and pt_vcl_cpb_alt_initial_removal_offset_delta[i][j] is not present for any value of i less than bp_max_sublayers_minus1, its value is inferred to be equal to 0.

pt_vcl_cpb_delay_offset[i] specifies, for the i-th sublayer for the VCL HRD, an offset to be used in the derivation of the nominal CPB removal times of the AU associated with the PT SEI message and of the AUs following in decoding order, when the AU associated with the PT SEI message directly follows in decoding order the AU associated with the BP SEI message. The length of pt_vcl_cpb_delay_offset [i] is bp_cpb_removal_delay_length_minus1+1 bits. When not present, the value of pt_vcl_cpb_delay_offset[i] is inferred to be equal to 0.

pt_vcl_dpb_delay_offset[i] specifies, for the i-th sublayer for the VCL HRD, an offset to be used in the derivation of the DPB output times of the IRAP AU associated with the BP SEI message when the AU associated with the PT SEI message directly follows in decoding order the TRAP AU associated with the BP SEI message. The length of pt_vcl_dpb_delay_offset[i] is bp_dpb_output_delay_length_minus1+1 bits. When not present, the value of pt_vcl_dpb_delay_offset[i] is inferred to be equal to 0.

The variable BpResetFlag of the current picture is derived as follows:
If the current picture is associated with a BP SEI message, BpResetFlag is set equal to 1.
Otherwise, BpResetFlag is set equal to 0.

pt_sublayer_delays_present_flag[i] equal to 1 specifies that pt_cpb_removal_delay_delta_idx[i] or pt_cpb_removal_delay_minus1[i], and pt_du_common_cpb_removal_delay_increment_minus1[i] or pt_du_cpb_removal_delay_increment_minus1[ ][ ] are present for the sublayer with TemporalId equal to i. sublayer_delays_present_flag[i] equal to 0 specifies that neither pt_cpb_removal_delay_delta_idx[i] nor pt_cpb_removal_delay_minus1[i] and neither pt_du_common_cpb_removal_delay_increment_minus1[i] nor pt_du_cpb_removal_delay_increment_minus1[ ][ ] are present for the sublayer with TemporalId equal to i. The value of pt_sublayer_delays_present_flag[bp_max_sublayers_minus1] is inferred to be equal to 1. When not present, the value of pt_sublayer_delays_present_flag[i] for any i in the range of 0 to bp_max_sublayers_minus1−1, inclusive, is inferred to be equal to 0.

pt_cpb_removal_delay_delta_enabled_flag[i] equal to 1 specifies that pt_cpb_removal_delay_delta_idx[i] is present in the PT SEI message. pt_cpb_removal_delay_delta_enabled_flag[i] equal to 0 specifies that pt_cpb_removal_delay_delta_idx[i] is not present in the PT SEI message. When not present, the value of pt_cpb_removal_delay_delta_enabled_flag[i] is inferred to be equal to 0.

pt_cpb_removal_delay_delta_idx[i] specifies the index of the CPB removal delta that applies to Htid equal to i in the list of bp_cpb_removal_delay_delta_val[j] for j ranging from 0 to bp_num_cpb_removal_delay_deltas_minus1, inclusive. The length of pt_cpb_removal_delay_delta_idx[i] is Ceil(Log 2(bp_num_cpb_removal_delay_deltas_minus1+1)) bits. When pt_cpb_removal_delay_delta_idx[i] is not present and pt_cpb_removal_delay_delta_enabled_flag[i] is equal to 1, the value of pt_cpb_removal_delay_delta_idx[i] is inferred to be equal to 0.

The variables CpbRemovalDelayMsb[i] and CpbRemovalDelayVal[i] of the current picture are derived as follows:
If the current AU is the AU that initializes the HRD, CpbRemovalDelayMsb[i] and CpbRemovalDelayVal[i] are both set equal to 0, and the value of cpbRemovalDelayValTmp[i] is set equal to pt_cpb_removal_delay_minus1[i]+1.
Otherwise, let the picture prevNonDiscardablePic be the previous picture in decoding order that has TemporalId equal to 0 that is not a RASL or DL, let prevCpbRemovalDelayMinus1 [i], prevCpbRemovalDelayMsb[i], and prevBpResetFlag be set equal to the values of cpbRemovalDelayValTmp[i]−1, CpbRemovalDelayMsb[i], and BpResetFlag, respectively, for the picture prevNonDiscardablePic, and the following applies:

- CpbRemovalDelayMsb[ i ] is derived as follows:
  cpbRemovalDelayValTmp[ i ] = pt_cpb_removal_delay_delta_enabled_flag[ i ] ?
    pt_cpb_removal_delay_minus1[ bp_max_sublayers_minus1 ] + 1 +
    bp_cpb_removal_delay_delta_val[ pt_cpb_removal_delay_delta_idx[ i ] ] :
    pt_cpb_removal_delay_minus1[ i ] + 1
if( prevBpResetFlag )
  CpbRemovalDelayMsb[ i ] = 0
else if( cpbRemovalDelayValTmp[ i ] < prevCpbRemovalDelayMinus1[ i ] )
  CpbRemovalDelayMsb[ i ] = prevCpbRemovalDelayMsb[ i ] +
  $2^{bp\_cpb\_removal\_delay\_length\_minus1 + 1}$ (D.1)
else
  CpbRemovalDelayMsb[ i ] = prevCpbRemovalDelayMsb[ i ]
- CpbRemovalDelayVal is derived as follows:
if( pt_sublayer_delays_present_flag[ i ] )
  CpbRemovalDelayVal[ i ] = CpbRemovalDelayMsb[ i ] + cpbRemovalDelayValTmp[ i ]
  (D.2)
else
  CpbRemovalDelayVal[ i ] = CpbRemovalDelayVal[ i + 1 ]
The value of CpbRemovalDelayVal[ i ] shall be in the range of 1 to $2^{32}$, inclusive.
The variable AuDpbOutputDelta[ i ] is derived as follows:
AuDpbOutputDelta[ i ] = CpbRemovalDelayVal[ i ] −
  ( pt_cpb_removal_delay_minus1[ bp_max_sublayers_minus1 ] + 1 ) − (D.3)
  ( i = = bp_max_sublayers_minus1 ? 0 : bp_dpb_output_tid_offset[ i ] )

Where the value of bp_dpb_output_tid_offset[i] is found in the associated BP SEI message. pt_dpb_output_delay is used to compute the DPB output time of the picture. It specifies how many clock ticks to wait after removal of an AU from the CPB before the decoded picture is output from the DPB.

NOTE 2—A decoded picture is not removed from the DPB at its output time when it is still marked as "used for short-term reference" or "used for long-term reference".

The length of pt_dpb_output_delay is bp_dpb_output_delay_length_minus1+1 bits. When max_dec_pic_buffering_minus1[Htid] is equal to 0, the value of pt_dpb_output_delay shall be equal to 0.

The output time derived from the pt_dpb_output_delay of any picture that is output from an output timing conforming decoder shall precede the output time derived from the pt_dpb_output_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has ph_no_output_of_prior_pics_flag equal to 1 or inferred to be equal to 1, the output times derived from pt_dpb_output_delay shall be increasing with increasing value of PicOrderCntVal relative to all pictures within the same CVS.

pt_dpb_output_du_delay is used to compute the DPB output time of the picture when DecodingUnitHrdFlag is equal to 1. It specifies how many sub-clock ticks to wait after removal of the last DU in an AU from the CPB before the decoded picture is output from the DPB.

The length of the syntax element pt_dpb_output_du_delay is given in bits by bp_dpb_output_delay_du_length_minus1+1.

The output time derived from the pt_dpb_output_du_delay of any picture that is output from an output timing conforming decoder shall precede the output time derived from the pt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has ph_no_output_of_prior_pics_flag equal to 1 or inferred to be equal to 1, the output times derived from pt_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

pt_num_decoding_units_minus1 plus 1 specifies the number of DUs in the AU the PT SEI message is associated with. The value of pt_num_decoding_units_minus1 shall be in the range of 0 to PicSizeInCtbsY−1, inclusive.

pt_du_common_cpb_removal_delay_flag equal to 1 specifies that the syntax elements pt_du_common_cpb_removal_delay_increment_minus1[i] are present. pt_du_common_cpb_removal_delay_flag equal to 0 specifies that the syntax elements pt_du_common_cpb_removal_delay_increment_minus1[i] are not present. When not present pt_du_common_cpb_removal_delay_flag is inferred to be equal to 0.

pt_du_common_cpb_removal_delay_increment_minus1[i] plus 1 specifies the duration, in units of clock sub-ticks (see clause C.1), between the nominal CPB removal times of any two consecutive DUs in decoding order in the AU associated with the PT SEI message when Htid is equal to i. This value is also used to calculate an earliest possible time of arrival of DU data into the CPB for the HSS, as specified in Annex C. The length of this syntax element is bp_du_cpb_removal_delay_increment_length_minus1+1 bits.

When pt_du_common_cpb_removal_delay_increment_minus1[i] is not present for any value of i less than bp_max_sublayers_minus1, its value is inferred to be equal to pt_du_common_cpb_removal_delay_increment_minus1[bp_max_sublayers_minus1].

pt_num_nalus_in_du_minus1[i] plus 1 specifies the number of NAL units in the i-th DU of the AU the PT SEI message is associated with. The value of pt_num_nalus_in_du_minus1[i] shall be in the range of 0 to PicSizeInCtbsY−1, inclusive.

The first DU of the AU consists of the first pt_num_nalus_in_du_minus1[0]+1 consecutive NAL units in decoding order in the AU. The i-th (with i greater than 0) DU of the AU consists of the pt_num_nalus_in_du_minus1[i]+1 consecutive NAL units immediately following the last NAL unit in the previous DU of the AU, in decoding order. There shall be at least one VCL NAL unit in each DU. All non-VCL NAL units associated with a VCL NAL unit shall be included in the same DU as the VCL NAL unit.

pt_du_cpb_removal_delay_increment_minus1[i][j] plus 1 specifies the duration, in units of clock sub-ticks, between the nominal CPB removal times of the (i+1)-th DU and the i-th DU, in decoding order, in the AU associated with the PT SEI message when Htid is equal to j. This value is also used to calculate an earliest possible time of arrival of DU data into the CPB for the HSS, as specified in Annex C. The length of this syntax element is bp_du_cpb_removal_delay_increment_length_minus1+1 bits.

When pt_du_cpb_removal_delay_increment_minus1[i][j] is not present for any value of j less than bp_max_sublayers_minus1, its value is inferred to be equal to pt_du_cpb_removal_delay_increment_minus1[i][bp_max_sublayers_minus1].

pt_delay_for_concatenation_ensured_flag equal to 1 specifies that the difference between the final arrival time and the CPB removal time of the AU associated with the PT SEI message is such that when followed by an AU with a BP SEI message with bp_concatenation_flag equal to 1 and InitCpbRemovalDelay[ ][ ] [Ed. (YK): Check whether it's precise to use "InitCpbRemovalDelay[Htid][ScIdx]" herein.] less than or equal to the value of bp_max_initial_removal_delay_for_concatenation, the nominal removal time of the following AU from the CPB computed with bp_cpb_removal_delay_delta_minus1 applies. pt_delay_for_concatenation_ensured_flag equal to 0 specifies that the difference between the final arrival time and the CPB removal time of the AU associated with the PT SEI message may or may not exceed the value of max_val_initial_removal_delay_for_splicing.

pt_display_elemental_periods_minus1 plus 1, when sps_field_seq_flag is equal to 0 and fixed_pic_rate_within_cvs_flag[TemporalId] is equal to 1, indicates the number of elemental picture period intervals that the current coded picture occupies for the display model.

When fixed_pic_rate_within_cvs_flag[TemporalId] is equal to 0 or sps_field_seq_flag is equal to 1, the value of pt_display_elemental_periods_minus1 shall be equal to 0.

When sps_field_seq_flag is equal to 0 and fixed_pic_rate_within_cvs_flag[TemporalId] is equal to 1, a value of pt_display_elemental_periods_minus1 greater than 0 may be used to indicate a frame repetition period for displays that use a fixed frame refresh interval equal to DpbOutputElementalInterval[n] as given by Equation 112.

Let's resume the discussion of the problems addressed herein.

A further issue that needs to be solved is that sometimes even though a PT SEI message might not be present similar results need to be obtained, i.e. allow repetition without the PT SEI message being present, since PT SEI messages are optional.

Note also that there is an interaction with the frame field information SEI message, that is required when sps_field_seq_flag is equal to 1 and optional when 0, and the information in the PT SEI message (pt_display_elemental_periods_minus1). Such an SEI (frame-field information SEI) has also a syntax element that has the same value as the PT SEI message. Namely:

display_elemental_periods_minus1 plus 1, when present (it might only be coded if field_pic_flag is off, or it might not be coded if field_pic_flag is on) and FixedPicRateWithinCvsFlag is equal to 1, indicates the number of elemental picture period intervals that the current coded picture occupies for the display model. The value of display_elemental_periods_minus1 shall be equal to DisplayElementalPeriods−1 and is constrained as follows:

If display_fields_from_frame_flag is equal to 1, display_elemental_periods_minus1 shall be equal to 1 or 2.

Otherwise, when FixedPicRateWithinCvsFlag is equal to 0, display_elemental_periods_minus1 shall be equal to 0.

The interpretation of combinations of field_pic_flag (in frame-field SEI; supposed to be equal to sps_field_seq_flag), FixedPicRateWithinCvsFlag, bottom_field_flag, display_fields_from_frame_flag, top_field_first_flag, and display_elemental_periods_minus1 (through DisplayElementalPeriods) is specified in Table 14, in which syntax elements that are not present are indicated by "-". Combinations of syntax elements that are not listed in Table 14 are reserved for future use by ITU-T|ISO/IEC and shall not be present in bitstreams conforming to this version of this Specification.

NOTE 1—When FixedPicRateWithinCvsFlag is equal to 1, the indicated display times are constrained to account for time duration for a display model that follows the display patterns indicated by the values of the syntax elements of the frame-field information SEI message (although the display process is outside the scope of this Specification). Although the video decoder model might be specified to only output the entire cropped decoded picture, the modelled display behaviour sometimes includes other steps, such as the repeated display of a frame for multiple time intervals when display_fields_from_frame_flag is equal to 0 or the sequential display of the individual fields of a frame when display_fields_from_frame_flag is equal to 1, NOTE 2—Frame doubling can be used to facilitate the display, for example, of 25 Hz progressive-scan video on a 50 Hz progressive-scan display or 30 Hz progressive-scan video on a 60 Hz progressive-scan display, Using frame doubling and frame tripling in alternating combination on every other frame can be used to facilitate the display of 24 Hz progressive-scan video on a 60 Hz progressive-scan

TABLE 14

Interpretation of frame-field information syntax elements

| field_pic_flag | FixedPicRateWithinCvsFlag | bottom_field_flag | display_fields_from_frame_flags | top_field_first_flag | DisplayElementalPeriods | Indicated display of the picture by the display model |
|---|---|---|---|---|---|---|
| 0 | 0 | — | 0 | — | 1 | (progressive) Frame |
|   |   | — | 1 | 0 | 2 | Bottom field, top field, in that order |
|   |   | — | 1 | 1 | 2 | Top field, bottom field, in that order |
|   |   | — | 1 | 0 | 3 | Bottom field, top field, bottom field repeated, in that order |
|   |   | — | 1 | 1 | 3 | Top field, bottom field, top field repeated, in that order |
|   | 1 | — | 0 | — | n | (progressive) Frame displayed for n elemental periods of time |
|   |   | — | 1 | 0 | 2 | Bottom field, top field, in that order, each displayed for 1 elemental period of time |
|   |   | — | 1 | 1 | 2 | Top field, bottom field, in that order, each displayed for 1 elemental period of time |
|   |   | — | 1 | 0 | 3 | Bottom field, top field, bottom field repeated, in that order, each displayed for 1 elemental period of time |
|   |   | — | 1 | 1 | 3 | Top field, bottom field, top field repeated, in that order, each displayed for 1 elemental period of time |

TABLE 14-continued

Interpretation of frame-field information syntax elements

| field_pic_flag | FixedPicRateWithinCvsFlag | bottom_field_flag | display_fields_from_frame_flags | top_field_first_flag | DisplayElementalPeriods | Indicated display of the picture by the display model |
|---|---|---|---|---|---|---|
| 1 | 0 | 0 | — | — | 1 | Top field |
|  |  | 1 | — | — | 1 | Bottom field |
|  | 1 | 0 | — | — | 1 | Top field displayed for 1 elemental period of time |
|  |  | 1 | — | — | — | Bottom field displayed for 1 elemental period of time |

Note that there is an issue with multi layer when part of the output layers contain fields (E.g., in interlaced video, pictures may be partitioned into a first field and a second field, the first and second fields being output at consecutive time instances. Thus, pictures of the first field may be regarded as belonging to a first temporal sublayer, e.g. $25_0$, and pictures of the second field may be regarded as belonging to a second temporal sublayer, e.g. $25_1$, the video sequence of the layer having fields thus having a higher, e.g. double, framerate) and some layers do not as both sets together (i.e., e.g., a bitstream comprising both layers, one with and one without fields) would have different output framerates; which means that in a more general case, the problem arises for any multi layer bitstream that has output layers with different output framerates as shows below in FIG. 9.

FIG. 9 illustrates a video bitstream having a first layer $24_1$ and the second layer $24_0$. The first layer $24_1$ comprises three temporal sublayers, namely sublayer $25_0$, sublayer $25_1$ and sublayer $25_2$. In contrast, the second layer $24_0$ comprises picture of the first temporal sublayer $25_0$, the second temporal sublayer $25_1$ but does not includes pictures of the third temporal sublayer $25_2$. Thus, the second layer $24_0$ as a lower, e.g., the half, framerate of the first layer.

In other words, FIG. 9 illustrates an example of a two-layer bitstream with different framerates. For example, the higher layer $24_1$ may have fields and the lower layer $24_0$ may have progressive frames (e.g., no interlacing).

In the example of FIG. 9, the highest layer $24_1$ has a double framerate as the lower layer $24_0$ and does not have repetition. But if fixed framerate is signalled for the OLS, actually repetition could be desired in the lowest layer $24_0$ as shown below in FIG. 10.

FIG. 10 illustrates an example of the video bitstream of FIG. 9 in which output frames in the lower layer $24_0$ which has a lower coded framerate than the higher layer $24_1$ are repeated. Due to the repetition of the output frames the output framerate of both layers may be equal. Similar as in FIG. 8, the access unit output interval 63 of layer $24_0$ includes multiple picture output intervals 63.

In summary the following issues are solved in this aspect of the invention, the numbering indicating the sub-aspects, embodiments of which are described in the respective sections:
1. Different framerates in output layer of an output layer set (e.g., Multi-view with fields in enhancement layers and frames in base layer)
2. Interaction of PT SEI message and Frame-field information SEI message
3. Frame/Field repetition without PT SEI message
4. The constant output framerate across CVSs is derived and not signalled it would require SPS rewriting after splicing otherwise.
5. Derivation of output times without PT SEI message not being present or not being used.
6. Treatment of no-output pictures and implications on constant output framerate: In fact although not mentioned above, if some pictures are not output it may be complicated to derive output times when not present in PT SEI message or when PT SEI messages are ignored.

Before starting with the description of the sub-aspects of the second aspect, a brief summary of the above-described means for determining the output times of decoded pictures is described. For example, the video bitstream 14 may include a PT SEI message, which conveys information on a picture output timing. The PT SEI message may include a picture output multiplication syntax element, for example, pt_display_elemental_periods_minus1. For example, the PT SEI message may signal information on access unit levels. In other words, the PT SEI message may relate to an access unit 22. That is, a PT SEI message may be valid for all pictures within one access unit 22. The picture output multiplication syntax element signaled in the PT SEI message may reveal information on whether or not the access unit to which the respective PT SEI message refers subject to multiplied picture output, e.g., as shown for the lower layer $24_0$ of FIG. 10. For example, pt_display_elemental_periods_minus1 being zero may signify that the picture output is not multiplied and pt_display_elemental_periods_minus1>0 may indicate that the picture output is to be repeated. If the picture output is multiplied, the picture output multiplication syntax element may indicate how many output pictures are to be generated out of one picture of the respective access unit, e.g., by means of the value of pt_display_elemental_periods_minus1.

It is noted that the decoder may derive a variable called elementalOutputPeriods on the pt_display_elemental_periods_minus1. For example, decoder 50 may set elemental output periods equal to pt_display_elemental_periods_minus1+1.

In other words, encoder 10 may encode, video bitstream 14 may include, and decoder 50 may decode the PT SEI message.

Further, video bitstream 14 may include, encoded by encoder 10 and decoded by decoder 50, a frame field supplemental enhancement information (frame field SEI) message, also referred to as FFI SEI message, which conveys information in a frame field structure of the predetermined access unit e.g., whether pictures of that access unit are coded thereinto as frames or fields, and if coded as frames, whether same or turned into fields for picture output, and which order among bottom and top fields (first and second fields) is used for picture output. For example, the FFI SEI message may include a further picture output multiplication syntax element, e.g., FFI_display_elemental_periods_minus1. For example, further picture output multiplication syntax elements may indicate, for example, for the use case of frame fields, whether a coded picture is to be repeated or not, i.e., whether or not a picture to which the FFI SEI message refers is subject to multiple picture output. It is noted that the FFI SEI may, in contrast to the PT SEI message, refer to a single picture rather than to an entire access unit.

In the following, the above-described picture output multiplication syntax element of the PT SEI message may be referred to as PT multiplication indicator and the further picture output multiplication syntax element the FFI SEI message may be referred to as FF multiplication indicator.

For example, decoder 50 may, upon deriving the information that a picture is to be subject to multiplied picture output, set a number of times of a picture output, e.g., a repetition or generation of fields out of a decoded frame, for the respective access unit (in case of the PT multiplication indication) or the respective picture (e.g., in case of the FF multiplication indication) according to the number indicated by the picture output multiplication syntax element or the further picture output multiplication syntax element, respectively. In other words, decoder 50 may provide the output buffer with one or more repetitions of the respective picture. It is noted that according to embodiments of the present disclosure, this may only be true for certain situations.

2.1 Different Framerates in Different Output Layers of an Output Layer Set

As discussed, there might be an issue when there are different framerates in different output layers of an output layer set, as all HRD SEI messages (BP, PT and DUI) apply to each respective AU globally, i.e. to each picture within an AU without differentiating among layer and therefore it is not possible to indicate different repetition patterns or different values of elementalOutputPeriods with a single value of pt_display_elemental_periods_minus1. It is noted, that this may also apply to embodiments of other sub-aspects, e.g. sub-aspects 2.3 and 2.5.

Therefore, in one embodiment there is a gating flag (e.g. pt_display_elemental_periods_present_flag) in the PT SEI message that indicates whether the elementalOutputPeriods is set within the PT SEI message or not.

| | Descriptor |
|---|---|
| pic_timing( payloadSize ) { | |
| [...] | |
|   pt_display_elemental_periods_present_flag | u(1) |
|   if( pt_display_elemental_periods_present_flag ) | |
|     pt_display_elemental_periods_minus1 | u(4) |
| } | |

Thus, according to an embodiment, decoder 50 may decode, for an access unit 22, a PT SEI message. Decoder 50 may decode, from the picture timing supplemental enhancement information message, a gating flag (e.g. pt_display_elemental_periods_present_flag) and, if the gating flag is in a first state, a picture output multiplication syntax element (e.g. pt_display_elemental_periods_minus1) revealing information on whether or not the predetermined access unit is subject to multiplied picture output (e.g. pt_display_elemental_periods_minus1 being 0 or greater than 0) and, if so, how many output pictures are to be generated out of the predetermined access unit (e.g. pt_display_elemental_periods_minus1>0).

Semantics in case of pt_display_elemental_periods_minus1 being inferred: When not present the value of pt_display_elemental_periods_minus1 is not inferred as it is not used. Instead the information is taken by other means as in 2.3.

This case applies unless aspect in 2.5 is taken into account, in which case there is a constraint that the value of elementalOutputPeriods is signalled to be constraint to one (see 2.5).

In another embodiment there is a bitstream constraint that requires pt_display_elemental_periods_present_flag to be equal to 0 when one of the following applies:
  Framerates of output layers of an OLS are different
  The value of sps_field_seq_flag of all SPS referred to by the output layers of the OLS corresponding to the bitstream is not the same.

2.2 Interaction of PT SEI Message and Frame-Field Information SEI Message

As discussed, a frame-field information SEI message might be present that indicates further information on how to output frames. For that purpose, in one embodiment usage of the information in the picture timing SEI message together with the frame-field information SEI message is used in a constraint manner. (Note that per the embodiment above, this would only apply when the PT SEI message is present and the syntax element pt_display_elemental_periods_present_flag is equal to 1)

When sps_field_seq_flag in the SPS referred to by the VCL NAL units of the layer is equal to 1 (the bitstream contains fields), pt_display_elemental_periods_minus1 shall be equal to 0 irrespective of the values in the frame-field information SEI messages. Otherwise, if sps_field_seq_flag in the SPS referred to by the VCL NAL units of the layer is equal to 0 (the bitstream contains frames) and display_fields_from_frame_flag is equal to 0 (frames are not displayed as fields) and fixed_pic_rate_within_cvs_flag[TemporalId] is equal to 0, then the value of pt_display_elemental_periods_minus1 shall be equal to 0, i.e. in such a cases as there is no constant output framerate and there is not field output from frames.

According to embodiments of sub-aspect 2.2, encoder 10 is configured to encode into the video data stream 14, for a predetermined access unit 22 of the video data stream, a PT SEI message which conveys information on a picture output timing for the predetermined access unit. Further, encoder 10 is configured to encode for a picture sequence, including a picture in the predetermined access unit, a sequence parameter set (e.g. SPS) including a frame-field syntax element (e.g. sps_field_seq_flag) indicative of whether pictures of the picture sequence represent fields or represent frames (e.g. progressive frames), and a fixed-picture rate flag (e.g. in SPS or VPS) indicative of whether a picture output for the video data stream involves a fixed picture rate. Encoder 10 is configured to set a picture output multiplication syntax element (e.g. pt_display_elemental_periods_minus1) as indicating no multiplied picture output for the predetermined access unit,
  in case of the frame-field syntax element indicating that the pictures of the picture sequence represent fields, and/or
  in case of the frame-field syntax element indicating that the pictures of the picture sequence represent frames, a frame-to-filed syntax element in the video data stream indicating that the frames are not displayed as fields (e.g. indicated in the frame-field supplemental enhancement information message or derived by, inferred in case of, its absence), and the fixed-picture rate flag indicating the picture output as not involving a fixed picture rate.

According to an embodiment, the video data stream 14 is a multi-layered video data stream comprising an output layer set (OLS) of one or more output layers (e.g. those layers whose pictures are output; there might be one or more reference layer not output but serving as reference layers). According to this embodiment, the picture timing supplemental enhancement information message conveys the information on the picture output timing with respect to all of output layers of the multi-layered video data stream having a picture coded into the predetermined access unit. According to this embodiment, the picture sequence is of the predetermined output layer, including a picture of the predetermined output layer in the predetermined access unit, and the frame-field syntax element (e.g. sps_field_seq_flag) is indicative of whether pictures of the picture sequence of the predetermined output layer represent fields or represent frames. According to this embodiment, the fixed-picture rate flag (e.g. in SPS or VPS) indicative of whether a picture output for the output layer set involves a fixed picture rate with respect to the output layer set. According to this embodiment, the encoder is configured to set the picture output multiplication syntax element (e.g. pt_display_elemental_periods_minus1) as indicating no multiplied picture output for the predetermined access unit, in case of the frame-field syntax element indicating that the pictures of the picture sequence of the predetermined output layer represent fields, and/or in case of the frame-field syntax element indicating that the pictures of the picture sequence of the predetermined output layer represent frames, a frame-to-filed syntax element (e.g. display_fields_from_frame_flag), indicating that the frames are not displayed as fields (e.g. indicated in the frame-field supplemental enhancement information message or derived by, inferred in case of, its absence), and the fixed-picture rate flag indicating the picture output for the output layer set as not involving a fixed picture rate.

According to an embodiment, the encoder 10 is configured to encode into the video data stream 14, for the predetermined access unit of the video data stream, a FFI SEI message which conveys information on a frame-field structure for the predetermined access unit, and comprises the frame-to-filed syntax element (e.g. display_fields_from_frame_flag).

According to an embodiment, the video data stream 14 is a multi-layered video data stream comprising an output layer set (OLS) of one or more output layers (e.g. those layers whose pictures are output; there might be one or more reference layer not output but serving as reference layers). According to this embodiment, the picture timing supplemental enhancement information message conveys the information on the picture output timing with respect to all of output layers of the multi-layered video data stream having a picture coded into the predetermined access unit. According to this embodiment, the frame-filed supplemental enhancement information message is specific for a predetermined output layer of the multi-layered video data stream and conveys the information on the frame-field structure relating to the predetermined output layer for the predetermined access unit. According to this embodiment, the picture sequence is of the predetermined output layer, including a picture of the predetermined output layer in the predetermined access unit, and the frame-field syntax element (e.g. sps_field_seq_flag) is indicative of whether pictures of the picture sequence of the predetermined output layer represent fields or represent frames. According to this embodiment, the fixed-picture rate flag (e.g. in SPS or VPS) indicative of whether a picture output for the output layer set involves a fixed picture rate with respect to the output layer set. According to this embodiment, the encoder is configured to set the picture output multiplication syntax element (e.g. pt_display_elemental_periods_minus1) as indicating no multiplied picture output for the predetermined access unit, in case of the frame-field syntax element indicating that the pictures of the picture sequence of the predetermined output layer represent fields, and/or in case of the frame-field syntax element indicating that the pictures of the picture sequence of the predetermined output layer represent frames, the frame-to-filed syntax element indicating that the frames are not displayed as fields (e.g. indicated in the frame-field supplemental enhancement information message or derived by, inferred in case of, its absence), and the fixed-picture rate flag indicating the picture output for the output layer set as not involving a fixed picture rate.

2.3 Frame or Field Repetition without PT SEI Message

In another embodiment, the third issue (Frame/Field repetition without PT SEI message) listed above is solved, by external means (e.g. an API) for elementalOutputPeriods so that not only 1 when PT not present or when there is a frame-field information SEI message. It also solves the problem indicated in 1) as when the output framerates of different layers are different there is no information in the PT SEI message related to elementalOutputPeriods and the frame-field information SEI as a per-layer SEI message provides this information.

elemental_duration_in_tc_minus1[i] plus 1 (when present) specifies, when Htid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

When Htid is equal to i and fixed_pic_rate_general_flag[i] is equal to 1 for a CVS containing picture n, and picture n is a picture that is output and is not the last picture in the bitstream (in output order) that is output, the value of the variable DpbOutputElementalInterval[n] is specified by:

$$DpbOutputElementalInterval[n] = DpbOutputInterval[n] \div elementalOutputPeriods \quad (113)$$

where DpbOutputInterval[n] is specified in Equation C.16 and elementalOutputPeriods is specified as follows:

If a PT SEI message is present for picture n and pt_display_elemental_periods_present_flag equal to 1, elementalOutputPeriods is equal to the value of pt_display_elemental_periods_minus1+1.

If external means are provided elementalOutputPeriods is equal to the value of elementalOutputPeriods is set equal to the value provided via external means.

Otherwise (no external means is provided to set the value of elementalOutputPeriods), if a frame-field information SEI message is provided for the layer with the predefined index, the value of elementalOutputPeriods is set to display_elemental_periods_minus1+1. (is in noted that, throughout this description, display_elemental_periods_minus1 may be another name for to the above described ffi_display_elemental_periods_minus1 syntax element)

Otherwise, elementalOutputPeriods is equal to 1.

Wherein the layer with the predefined index used, e.g. with the highest framerate, is identified through one of the following methods:

Indicated through additional signalling in HRD SEIs, VPS/SPS or other means (e.g., fixed_pic_rate_layer_index), or The layer containing the highest sublayer identifier value (temporal_id), or The frame-field SEI message having a different value of display_elemental_periods_minus1 than pt_display_elemental_periods_minus1 in the applicable PT SEI message As an alternative to use an index of a layer to identify which frame-file information SEI message to use to determine the elementalOuputPeriods one of the following is considered:

1) Otherwise, if a frame-field information SEI message is provided for a layer with output pictures present in both AU n and the next AU in output order, i.e, AU containing nextPicInOutputOrder, the value of elementalOutputPeriods is set to display_elemental_periods_minus1+1

2) Otherwise, if frame-field information SEI messages are provided for the output pictures present in an AU, the value of elementalOutputPeriods is set to lowest value of display_elemental_periods_minus1+1 among all output layers.

Thus, according to an embodiment of the sub-aspect 2.3, decoder 50 is configured to derive a number of times of picture output for a predetermined access unit of the video data stream, e.g. a currently decoded access unit according to one or more of the following criteria: if the number of times of a picture output for the predetermined access unit is provided via an API of the decoder, adopt the number of times of picture output as provided via the API, and/or if a frame-field supplemental enhancement information message is present in the video data stream which conveys information on a frame-field structure for the predetermined access unit, and includes a further picture output multiplication syntax element (e.g. display_elemental_periods_minus1), decode the further picture output multiplication syntax element from the frame-field supplemental enhancement information message and set a number of times of picture output for the predetermined access unit according to the further picture output multiplication syntax element.

It is noted, that in general, the picture output multiplication syntax element may be represented by pt_display_elemental_periods_minus1+1 or may be represented pt_display_elemental_periods_minus1, as the choice of subtracting one before encoding is a mere choice of the symbolization scheme. In other words, the value of the picture output multiplication syntax element may correspond to the number of times of the picture output or may correspond to the number of times of the picture output minus 1. Same applies for the further picture output multiplication syntax element.

According to an embodiment, the video data stream 14 is a multi-layered video data stream, and includes a PT SEI message, which conveys, as described before, the information on the picture output timing with respect to all of output layers of the multi-layered video data stream having a picture coded into the predetermined access unit.

According to an embodiment, the above set of criteria further includes the following: if the PT SEI message is present in the video data stream which includes a picture output multiplication syntax element (e.g. pt_display_elemental_periods_minus1), decode the picture output multiplication syntax element from the PT SEI message and set a number of times of a picture output for the predetermined access unit according to the picture output multiplication syntax element.

As mentioned before, the PT SEI message may relate to all picture of the predetermined access unit, and the FFI SEI message may message convey the information on the frame-field structure for a picture of a predetermined output layer, which is coded into the predetermined access unit.

For example, in setting the number of times of picture output for the predetermined access unit according to the further picture output multiplication syntax element, decoder 50 may set the number of times of picture output for the predetermined output layer depending on the further picture output multiplication syntax element and determine an inter output picture interval (e.g. the above introduced variable DpbOutputElementalInterval) for the predetermined access unit using the further picture output multiplication syntax element. According to an embodiment, decoder 50 performs this choice of setting the number of times, if the predetermined output layer has pictures coded into the predetermined access unit and an immediately following access unit in output order.

According to an embodiment, decoder 50 may perform the setting the number of times of picture output for the predetermined access unit according to the further picture output multiplication syntax element according to one or more of the following criteria: According to a first criterion, if the predetermined output layer has pictures coded into the predetermined access unit and an immediately following access unit in output order, set the number of times of picture output for the predetermined output layer depending on the further picture output multiplication syntax element, and determine an inter output picture interval (DpbOutputElementalInterval) for the predetermined access unit using the further picture output multiplication syntax element (e.g., alternative 1 of the above alternatives to use an index of a layer to identify which frame-file information SEI message to use to determine the elementalOuputPeriods). According to a second criterion, if any other output layer has a picture coded into the predetermined output layer and this other output layer has a frame-field supplemental enhancement information message with an even further picture output multiplication syntax element, set the number of times of picture output for the predetermined output layer depending on the further picture output multiplication syntax element, and determine an inter output picture interval (DpbOutputElementalInterval) for the predetermined access unit using depending on a smaller one among the further picture output multiplication syntax element and the even further picture output multiplication syntax element (e.g., alternative 2 of the above alternatives to use an index of a layer to identify which frame-file information SEI message to use to determine the elementalOuputPeriods).

According to an embodiment, more than one output layer has a picture coded into the predetermined output layer and comprises a frame-field supplemental enhancement information message, and the predetermined output layer's further picture output multiplication syntax element is smallest. According to this embodiment, in setting the number of times of picture output for the predetermined access unit according to the further picture output multiplication syntax element, decoder 50 sets the number of times of picture output for the predetermined output layer depending on the further picture output multiplication syntax element, and determines an inter output picture interval (DpbOutputElementalInterval) for the predetermined access unit using the further picture output multiplication syntax element.

According to an embodiment, decoder 50, if setting the number of times of picture output for the predetermined access unit according to the picture output multiplication syntax element, sets the number of times of picture output equally for all output layers and determine an inter output picture interval (DpbOutputElementalInterval) for the predetermined access unit using the picture output multiplication syntax element. If setting the number of times of picture output for the predetermined access unit according to the further picture output multiplication syntax element, decoder 50 sets the number of times of picture output for the predetermined output layer depending on the further picture output multiplication syntax element and determine an inter output picture interval (DpbOutputElementalInterval) for the predetermined access unit using the further picture output multiplication syntax element.

According to an embodiment, decoder 50 determines the predetermined output layer according to one of the following:
- based on a signaling (e.g. specifically indicating the predetermined output layer) in the multi-layered video data stream,
- as the output layer with highest temporal sub-layer (e.g. decoder determines the sub-layers belonging to each output layer and appoints the output layer with highest (in terms of hierarchy, i.e. one which no other temporal layer of the output layers depends on, as the highest temporal layer), or
- as an output layer of the output layer set for which the further picture output multiplication syntax element differs from the picture output multiplication syntax element.

According to an embodiment, encoder 10 may provide a signalling for the predetermined output layer (e.g. specifically indicating the predetermined output layer) in the multi-layered video data stream. Alternatively, encoder 10 may select the output layer with highest temporal sub-layer (e.g. decoder determines the sub-layers belonging to each output layer and appoints the output layer with highest (in terms of hierarchy, i.e. one which no other temporal layer of the output layers depends on, as the highest temporal layer)) as the predetermined output layer. Alternatively, encoder 10 may select the predetermined output layer to be an output layer of the output layer set for which the further picture output multiplication syntax element differs from the picture output multiplication syntax element.

In alternative to the above embodiments of sub-aspect 2.3, further embodiments solve the problem by means of a bitstream constraint, e.g. as described with respect to FIG. 11.

FIG. 11 illustrates an encoder 10 according to an embodiment of the sub-aspect 2.3. Encoder 10 of FIG. 11 may optionally correspond to encoder 10 of FIG. 1. The video bitstream 14 according to this embodiment may be a single layered video bitstream or a multilayered video bitstream, e.g., as described with respect to FIG. 1. As described in section 0, video bitstream 14 has encoded thereinto a sequence of access units 22. A predetermined one of the access units 22 is reference using reference sign 22\* in FIG. 11. For example, the predetermined access unit is a currently coded access unit. Encoder 10 according to this embodiment encodes into the video bitstream 14, for the predetermined access unit 22\*, PT SEI message, e.g., the PT SEI message as described before within this section. The PT SEI message conveys information on picture output timing for the predetermined access unit 22\*. The PT SEI message 73 includes a picture output multiplication syntax element 74, also named PT multiplication indicator 73 in the following. For example, the PT multiplication indicator 73 may indicate the number of times of picture output for pictures of the predetermined access unit 22\* as described before.

According to this embodiment, encoder 10 further encodes, into the video data stream 14 an FFI SEI message 83, which conveys information on a frame field structure for the predetermined access unit 22\*, e.g., the FFI SEI message as preciously described within this section. The FFI SEI message 83 includes a further picture output multiplication syntax element 84, which may also be named FF multiplication indicator 84 in the following. As described before, the FF multiplication indicator 83 may indicate a number of times of picture output for one of the pictures of the predetermined access unit 22\*. For example, the FFI SEI message 83 may refer to one of layers, e.g., to one of output layers of the video bitstream 14.

The PT multiplication indicator 84 and the FF multiplication indicator 84 may be encoded into the video bitstream using a symbolization scheme and for the purpose of encoding the perspective syntax elements, the actual value of the respective syntax elements may be derived by subtracting one from the number of times of picture output represented by the respective syntax elements. In other words, in examples, the actual values of the PT multiplication indicator 74 and the FF multiplication indicator 84 written into video bitstream 14 may differ from the values represented by the PT multiplication indicator 74 and the FF multiplication indicator 84, e.g., by a value of 1. Nevertheless, the value of the PT multiplication indicator 74 and the FF multiplication indicator 84 shall be understood as the value representing the actual number of times of picture output.

According to the embodiment of FIG. 11, the PT multiplication indicator is equal to or smaller than the FF multiplication indicator.

According to embodiments, the information of the FFI SEI 83 is specific to layers of the video bitstream 14. For example, video bitstream 14 may include an FFI SEI message 84 for each of output layers of the video bitstream 14. Alternatively, the FFI SEI message 83 may be provided on access unit level G, one FFI SEI message 83 may be provided for the predetermined access unit 22\* and the FFI SEI message 83 includes respective multiplication indicators 84 for each of one or more output layers having a picture coded into the predetermined access unit 22\*, According to this embodiment, the PT multiplication indicator 84 is equal to or smaller than the FF multiplication indicators 84 of all of the one or more output layers. For example, an output layer may represent a layer, pictures of which are considered for output by decoder 50, for example, as described in the introductory part of section 2.

For example, the video bitstream 14 is a multilayered video bitstream and the encoder 10 provides each one FFI SEI message 83 for one or more output layers of the video bitstream 14, thus providing one or more FFI SEI messages 83 each comprising a respective FF multiplication indicator 84. Each of the one FFI SEI message 83 may refer to one of the layers, of which one or more layers may be indicated to be output layers of an OLS indicated in the video bitstream 14. According to this embodiment, all of the FF multiplication indicators 84 signaled in the respective FFI SEI messages 83 signaled for the output layers are ≥the PT multiplication indicator 74. Accordingly, the smallest value beyond the FF multiplication indicators 84 is ≥the PT multiplication indicator 74.

According to an embodiment, the PT multiplication indicator 74 for the predetermined access units 22* is equal to the smallest value beyond the values of the FF multiplication indicators 84 of all the FFI SEI messages of the output layers in the predetermined access units 22*.

In other words, alternatively, the pt_display_elemental_periods_minus1 in the PT SEI message that applies to an AU is equal to the smallest value of the display_elemental_periods_minus1 in all the frame-field information SEI messages of the output layers in the AU.

According to an embodiment, the FF multiplication indicator 84 is an integer multiple of the PT multiplication indicator 74. It is noted that this constraint is valid in particular for the actual values for the number of times of picture output represented by the respective syntax element.

For example, decoder 50 may derive the above-mentioned ElementalOuputPeriods and DisplayElementalPeriods by setting elemental output periods to PT_display_elemental_periods_minus1+1, and by setting display elemental periods to display_elemental_periods_minus1+1. In this case, the above constraint may be applied to the variables elemental output periods and display elemental periods, i.e., display elemental periods may be an integer multiple of elemental output periods.

According to another embodiment, according to which the video bitstream 14 is a multi-layered video data stream 14 is a multilayered video data stream and according to which the PT SEI message 83 refers to all of output layers of the multi-layered video bitstream 14, and according to which the FFI SEI message relates to a predetermined output layer and thus, relates to a picture of the predetermined output layer, which is coded into the predetermined access unit 22*, encoder 10 is configured to encode the PT multiplication syntax element 74 and the FF multiplication indicator 84 so that the FF multiplication indicator 84 is x times the PT multiplication indicator 74 with x being a distance between the predetermined access unit 22* and a preceding or a subsequently access unit of the access units 22, which has a picture of the predetermined output layer encoded thereinto.

In other words, alternatively, the pt_display_elemental_periods_minus1 in the PT SEI message that applies to an AU and the display_elemental_periods_minus1 in the frame-field information SEI message that applies to each of the picture in the layers present in the AU do not need to be the same but there is a bitstream constraint as follows:

For each layer let picA and picB be two consecutive output pictures and let AuA and AuB be the n-th output AU and m-th AU in output order, the value of display_elemental_periods_minus1=((m−n)*(pt_display_elemental_periods_minus1+1))−1.

2.4 Derivation of Framerate Periodicity

According to embodiments of this sub-aspect, the constant output framerate across CVSs is derived and not signalled as it would require SPS rewriting after splicing otherwise. In other words, instead of signaling whether or not the output framerate across CVSs is constant, this information may be derived, e.g. by decoder 50.

In other words, in a further embodiment, the fourth issue listed above is solved as follows. Instead of signalling whether the constant framerate (fixed picture rate) property is kept after the splicing point, this property is derived as follows.

When Htid is equal to i and fixed_pic_rate_within_cvs_flag[i] is equal to 1 for a CVS containing picture n, and picture n is a picture that is output and is not the last picture in the bitstream (in output order) that is output, the value computed for DpbOutputElementalInterval [n] shall be equal to ClockTick*(elemental_duration_in_tc_minus1[i]+1), wherein ClockTick is as specified in Equation C.1 (using the value of ClockTick for the CVS containing picture n) when one of the following conditions is true for the following picture in output order nextPicInOutputOrder that is specified for use in Equation C.16:

picture nextPicInOutputOrder is in the same CVS as picture n.

picture nextPicInOutputOrder is in a different CVS and fixed_pic_rate_within_cvs_flag[i] is equal to 1 in the CVS containing picture nextPicInOutputOrder, the value of ClockTick is the same for both CVSs, and the value of elemental_duration_in_tc_minus1[i] is the same for both CVSs and one or more of the following conditions are true:

GOP sizes is the same

DPB parameters are the same

Reordering parameter within the DPB parameters are the same nextPicInOutputOrder is not a noOutput picture No RASL pictures are associated with the nextPicInOutputOrder (being a CRA)

additional syntax element indicating the output delay of the first AU in the CVS (described in the following aspect in Fehler! Verweisquelle konnte nicht gefunden werden.)

The nextPicInOutputOrder has a value equal to 0 of NoOutputOfPriorPicsFlag, which is set equal to ph_no_output_of_prior_pics_flag in the picture header of the nextPicInOutputOrder. Note that this parameter is indicating at CVS boundaries that the previous picture still in the DPB of the previous CVS are not output.

The aspect regarding Group Of Pictures (GOP) sizes and DPB parameters and reordering is illustrated in the following FIG. 12. The first number below the pictures 26 corresponds to the decoding time and the second number to the output time (i.e. the numbers below the pictures are given as "decoding time–output time"). As can be seen depending on the GOP size the difference among output times and decoding times changes. This can be part of the DPB parameters, or some reordering information added into the bitstream. E.g. for GOP 4 the value would be 2 and for GOP 8 the value would be 3.

Thus, according to an embodiment of this sub-aspect, the video data stream 14 is a concatenation of coded video sequences, and encoder 10 is configured to encode, for each coded video sequence 20 of the video data stream 14, a parameter set including a fixed picture rate flag (e.g. fixed_pic_rate_within_cvs_flag) indicative of whether a picture output involves a fixed picture rate within the respective coded video sequence 20, and, if the fixed-picture rate flag indicates that the picture output involves a fixed picture rate within the respective coded video sequence, an elemental output picture duration syntax element (e.g. elemental_duration_in_tc_minus1[i]). According to this embodiment, encoder 10 is configured to signal in the data stream 14 by way of a one or more continuity detectability syntax elements that picture rate continuity is detectable to apply in transitioning from a first coded video sequence to a second coded video sequence, if all of the following applies:

- the fixed picture rate flag of the first and second coded video sequences indicate the picture output for the output layer set as involving a fixed picture rate in the first and second coded video sequences,
- elemental output picture duration syntax element for first and second coded video sequences is the same,
- one or more conditions of a set of conditions apply, wherein the set of conditions comprises one or more of:
  - the first and second coded video sequences coincide in GOP size,
  - the first and second coded video sequences coincide in a reordering syntax element (e.g. max_num_reorder_pics) which indicates a maximum allowed number of output pictures that can precede another output picture in a decoding order and follow the latter in an output order,
  - the first and second coded video sequences coincide in DPB parameters (e.g. indicating DPB picture removal times),
  - the second coded video sequence does not start with an IRAP which is associated with a RASL picture (e.g. does not start with an GRA),
  - the first and second coded video sequences coincide in an output delay syntax element signaled in the video data stream, which his indicative of an output delay of a first access unit of the first and second coded video sequences (e.g. the first AU in CVS 1 and the first AU in CVS 2 have the same output delay related to their decoding time. E.g. in picture times both have a syntax element=3 that indicate 3 pictures time delay form decoding to output),
  - the first AU in the second coded video sequence is not a non-output picture, and
  - the first AU in the second coded video sequence does not indicate that previous pictures from the first coded video sequence are not output.

The problem regarding no-output pictures is explained in more detail in section 2.6 of this document. The aspect related to RASL pictures is related to the no-output pictures as such RASL picture when being associated with the first AU of a CVS are not output and therefore can be seen as no-output pictures.

2.5 Derivation of Output Times, e.g., with PT SEI Message not being Present or not being Used Embodiments according to this sub-aspect may solve the fifth issue listed above.

According to a first embodiment of the sub-aspect 2.5, the decoder 50 is configured to decode, for a predetermined coded video sequence of the multi-layered video data stream, a parameter set including a fixed-picture rate flag indicative of whether a picture output involves a fixed picture rate within the predetermined coded video sequence, and, if the fixed-picture rate flag indicates that the picture output involves a fixed picture rate within the predetermined coded video sequence, an elemental output picture duration syntax element. According to this embodiment, the decoder 50 is configured to determine an output delay (picture output time of a first picture) for the predetermined coded video sequence based on a product having a first factor determined by the elemental output picture duration syntax element and a second factor determined using a reordering syntax element in DPB parameters which indicates a maximum allowed number of pictures of the output picture set that can precede any picture in the OLS in a decoding order and follow that picture in an output order. Alternatively, decoder 50 is configured to determine an output delay (picture output time of a first picture) for the predetermined coded video sequence based on a product having a first factor determined by the elemental output picture duration syntax element and a second factor indicated by a delay syntax element in the video data stream.

According to the first embodiment, encoder 10 configured to encode, for the predetermined coded video sequence of the multi-layered video data stream, the parameter set (e.g. a VPS parameter set or SPS parameter set with HRD and timing information) into the video data stream (14) which includes the fixed-picture rate flag, e.g. fixed_pic_rate_within_cvs_flag, indicative of whether a picture output involves a fixed picture rate within the predetermined coded video sequence, and, if the fixed-picture rate flag indicates that the picture output involves a fixed picture rate within the predetermined coded video sequence, an elemental output picture duration syntax element, e.g. elemental_duration_in_tc_minus1. According to this embodiment, the encoder 10 is configured to signal in the data stream that by way of one or more output delay computability syntax elements (e.g. ones currently indicating that PT/BP- . . . SEIs are not required or not contained by the video data stream) an output delay (picture output time of a first picture) for the predetermined coded video sequence is computable based on a product having a first factor determined by the elemental output picture duration syntax element and a second factor determined using a reordering syntax element in DPB parameters which indicates a maximum allowed number of pictures of the output picture set that can precede any picture in the OLS in a decoding order and follow that picture in an output order. According to this embodiment, the encoder 10 is configured to signal in the data stream that by way of one or more output delay computability syntax elements (e.g. ones currently indicating that PT/BP- . . . SEIs are not required or not contained by the video data stream) an output delay (picture output time of a first picture) for the predetermined coded video sequence is computable based on a product having a first factor determined by the elemental output picture duration syntax element and a second factor indicated by a delay syntax element in the video data stream (14).

In other words, a first embodiment according to sub-aspect 2.5 consists of indicating in the bitstream that the timing information can be derived without PT SEI and BP SEI and derive the outputTime for a first AU (e.g. first AU of a CVS 20) depending on DPB parameters or additional parameters. Note that the Buffering Period (BP) SEI message and the Picture Timing (PT) SEI message contain timing information as when to remove an AU from the CPB and when to output an AU from the DPB. There are several values (e.g. for different highest temporal IDs being present in the bitstream) that can be used to derive when to decode an AU (remove from CPB) and when to output (from DPB). The output times can be derived without the help of these SEI message under some conditions explained below. The output times can be derived as either of the two options as follows:

If the DPB parameters are used, the value of the output time is derived as ClockTick*(elemental_duration_in_tc_minus1 [i]+1)*NumPics, where NumPics is the number of reordered pictures signalled in the DPB parameters (max_num_reorder_pics) or the maximum allowed number of pictures of the OLS that can precede any picture in the OLS in decoding order and follow that picture in output order plus the maximum number of pictures in the OLS that can precede any picture in the OLS in output order and follow that picture in decoding order (max_num_reorder_pics+ max_latency_increase_plus1), or Additional signalling is added to the VPS or SPS related to fixed picture rate indicating a given number of pictures NumPics and this syntax is used to compute the value of the output time that is derived as Clock-Tick*(elemental_duration_in_tc_minus1[i]+1)*NumPics.

FIG. 13 illustrates examples of an encoder 10, a video bitstream 14 and a decoder 50 according to a second embodiment of the sub-aspect 2.5. Encoder 10, video bitstream 14 and decoder 50 may optionally correspond to encoder 10, video bitstream 14 and decoder 50 according to FIG. 1. Also, embodiments according to this sub-aspect may optionally include features and details described with respect to sub-aspect 2.3, e.g. with respect to FIG. 11.

According to the embodiment of FIG. 13, encoder 10 encodes, into the video bitstream 14, a parameter set 93 for a predetermined coded video sequence 20. That is, the parameter set 93 is associated to one of one or more coded video sequences 20 of the video bitstream 14. The parameter set 93 includes a fixed picture rate flag 94, which may, for example, correspond to the fixed_pic_rate_within_CVS_flag described herein. The fixed picture rate flag 94 is indicative of whether a picture output involves a fixed picture rate within the predetermined coded video sequence 20. If the fixed picture rate flag 93 indicates that the picture output involves a fixed picture rate within the predetermined coded video sequence 20, the parameter set 93 further includes an elemental output picture duration syntax element 96, which may, for example, correspond to the herein described elemental_duration_in_tc_minus1. E.g., the elemental output picture duration syntax element 96 may indicate a duration of a picture output interval, e.g. a duration of picture output interval 63 for a single picture.

For example, as illustrated in FIG. 13, each of access units 22 of the video bitstream 14 may be associated with an elemental picture output time 36. The elemental output picture time 36 may represent a time instance at which pictures of the respective access unit 22 are to be output by decoder 50, e.g. a time instance at which decoder 50 is to provide the respective access unit (i.e. the pictures thereof) to an output buffer. An access unit output interval 37 may indicate a time interval between elemental picture output times 36 of consecutive access units, and may, for example, correspond to the access unit output interval 61 as described with respect to FIGS. 8 and 10.

According to the embodiment of FIG. 13, encoder 10 encodes one or more syntax elements 66 into the video bitstream 14, and decoder 50 may infer, if the one or more syntax elements 66 have the first state, that access units of a coded video sequence 20, to which the one or more syntax elements 66 refer, have a first state, that pictures of the access units are not subject to multiplied output (e.g. infer pt_display_elemental_periods_minus1 to be 0 or elementalOutputs to be 1). Consequently, decoder 50 may derive the elemental output picture times 36 using the elemental output picture duration syntax element 96, e.g. by setting the access unit output interval 37, 61 equal to a value of the picture output interval indicated by the elemental output picture duration syntax element 96. Consequently, decoder 50 may determine the elemental output picture times 36 in absence of an indication for the number of repetitions, e.g. in absence of a PT SEI, which may consequently be omitted in the video bitstream 14.

For example, decoder 50 may, in general, derive the elemental picture output times 36 on the basis of the elemental output picture duration as indicated by the elemental output picture duration syntax element 96 and a number of repetitions of the pictures of the respective access unit, e.g. as indicated by a picture output multiplication syntax element or a further picture output multiplication syntax element (cf. section 2.3). To this end, decoder 50 may set a duration of a picture output interval, e.g. the picture output interval 63, e.g. represented by a variable DpbOutputElementalInterval, equal to a value indicated by elemental_duration_in_tc_minus1 (wherein the indicated value may correspond to a value actually written in the bitstream plus 1, and may optionally be scaled by a clock tick duration time which may optionally be signaled in the video bitstream 14, e.g. by a syntax element ClockTick, e.g. DpbOutputElementalInterval=ClockTick*(elemental_duration_in_tc_minus1+1).) and derive a variable DpbOutputInterval (e.g. the duration of the access unit output interval 61) by using DpbOutputElementalInterval and the number of repetitions of the respective picture (e.g. equation (113) in the definition of elemental_duration_in_tc_minus1 given in the introductory part of section 2, wherein the variable elementalOutputs represents the number of repetitions), which in case that the syntax elements 66 have the first state, is inferred to be 1. Consequently, in the case, in which the one or more syntax elements 66 have the first state, decoder 50 may set a duration of the access unit output interval 37 (or 61), e.g. DpbOutputInterval, equal to the value indicated by elemental_duration_in_tc_minus1 (e.g. the value which is derived from the actual value by adding 1 and/or by multiplication with the clock tick duration, E.g., DpbOutputInterval=ClockTick*(elemental_duration_in_tc_minus1+1)). In other word, in this case, in which the one or more syntax elements 66 have the first state, decoder 50 may interpret the elemental picture duration syntax element 96 as referring to the duration of the access unit output interval 37, 61.

For example, the parameter set 93 comprising the fixed picture rate flag 94 and optionally the elemental output picture duration syntax element 96 may be a sequence parameter set (SPS) which may relate globally to the coded video sequence 20, the SPS comprising HRD and timing information. Alternatively, the parameter set 93 may be a video parameter set (VPS) which may relate globally to the video bitstream 14.

According to the embodiment of FIG. 13, encoder 10 encodes one or more syntax elements 66 into the video bitstream 14. Encoder 10 encodes the video bitstream 14 in a manner so that, if the one or more syntax elements 66 have a first state, for each access unit 22 of the coded video sequence 20 (or the video bitstream 14), the respective access unit 22 is inferable to be not subject to multiplied output. For example, the variable elemental output periods as described in the introductory part of section 2 and also with respect to section 2.3 may be inferred to be one. Accordingly, the elemental picture output times 36 for the coded video sequence 20 are determinable based on the elemental output picture duration syntax element.

In other words, for example, in case that the one or more syntax elements 66 have the first state, decoder 50 may infer that the access units 22 are not subject to multiplied output and may, consequently, determine the elemental picture output time of a predetermined access unit by adding an elemental output picture duration signaled by the elemental output picture duration syntax element 96 to an elemental picture output time 36 of a preceding access unit of the predetermined access unit.

For example, if the one or more syntax elements 66 have the first state, encoder 10 may provide, if providing any picture output multiplication syntax element, e.g. the PT multiplication indicator 74 (or pt_display_elemental_periods_minus1), the picture output multiplication syntax element so that it signals single picture output, i.e. no multiplied picture output. Accordingly, decoder 50 may infer, in case that the one or more syntax elements 66 have the first state, that the picture output multiplication syntax element indicates non multiplied output, i.e. single output.

According to embodiments, the one or more syntax elements 66 are indicative of one or more of the video bitstream 14 containing (or not containing) HRD parameters (or bitstream conformance parameters) referring to bitstream portions of the video bitstream 14, e.g. a general_nal_hrd_params_present_flag=0, and HRD parameters (or bitstream conformance parameters) referring to a coded layer of the video bitstream 14, e.g. general_vcl_hrd_params_present_flag=0.

According to embodiments, the one or more syntax elements 66 may include one or more of a first syntax element and a second syntax element, each of which is indicative of the video bitstream 14 not containing (or containing) coded picture buffer (CPB) and bitrate parameters for a respective operation mode of a hypothetical reference decoder, e.g. NAL operation (e.g. an operation mode which may include SEI NAL units and header on top of VCL data) and VCL operation (e.g. an operation mode which may exclusively consider coded video data, e.g. VCL NAL units). For example, the one or more syntax elements 66 may include one or both of general_nal_hrd_params_present_flag and general_vcl_hrd_params_present_flag.

For example, the first state may be a state in which the one or more syntax elements indicate that the video bitstream 14 does not containing coded picture buffer (CPB) and bitrate parameters for both, a NAL operation mode and a VCL operation mode of the hypothetical reference decoder, e.g. general_nal_hrd_params_present_flag=0 and general_vcl_hrd_params_present_flag=0.

For example, the one or more syntax elements 66 may be encoded into one or more parameter sets of the video bitstream 14.

According to examples of the embodiment of FIG. 13, if the one or more syntax elements 66 have a second state, e.g. if the one or more syntax elements 66 indicate that the video bitstream 14 indicates that it contains the above-mentioned one or more parameters, encoder 10 may encode, for each access unit 22 of the video bitstream 14 or the coded video sequence 20, a picture output multiplication syntax element, e.g. the picture output multiplication syntax element 74 as described with respect to FIG. 11, into a PT SEI message 73, e.g. as described with respect to FIG. 11, of the video bitstream 14. As described with respect to FIG. 11, the picture output multiplication syntax element 74 may reveal information on whether or not the respective access unit 22, i.e. the access unit to which the PT SEI message 73 refers, is subject to multiplied output and, if so, how many sequential output pictures are to be generated out of the respective access unit 22. According to this example, the elemental picture output times 36 are determinable based on the elemental output picture duration syntax element 96 and the picture output multiplication syntax element. For example, decoder 50 may, if the one or more syntax elements 66 have the second state decode the picture output multiplication syntax element for each access unit and determine the elemental picture output times 36 for the access units of the coded video sequence 20 based on the elemental output picture duration syntax element 96 and the picture output multiplication syntax element. For example, decoder 50 may, for each access unit 22, multiply an output duration indicated by the elemental output picture duration syntax element by a number of repetitions indicated by the picture output multiplication syntax element, e.g. using the above mentioned variable elementalOutputs and equation (113), as described above with respect to the case the first syntax elements having the first case, but not inferring the repetitions to be 1.

In other words, in a further embodiment, e.g. the one of FIG. 13, there is an indication in the bitstream, e.g. in the VPS or the SPS that there is no PT SEI and BP SEIs in the bitstream and/or that they are not required, as well as there is information that the frame field SEI message is not present or not required, then repetition does not need to be included or taken into account, i.e. the decoder can derive elementalOutputPeriods to 1. This can be done with the mentioned syntax element that indicates that the timing can be derived without the PT SEI message and the BP SEI message or alternatively with a bitstream constraint. Note that in this case the pt_display_elemental_periods_minus1 can be inferred to be 0 when the PT SEI message is not present or when the syntax element is not present.

A bitstream constraint could be added as no_timing_infomation_sei_message_needed_flag or for instance conditioning the described operation to the case in which general_nal_hrd_params_present_flag and general_vd_hrd_params_present_flag indicating presence of CPB and bitrate parameters for NAL or VCL operation are both equal to 0. In the latter case, PT SEI messages or BP SEI message would not be required to be present and the operation without them could be simply be carried out by deriving elementalOutputPeriods to 1 and using elemental_duration_in_tc_minus1[1] as the output picture rate for deriving output times.

Accordingly, the sub-aspect 2.5 provides a concept for determining the elemental picture output times 36 without the PT SEI message being present. Consequently, the PT SEI message does not necessarily have to be encoded into the video bitstream 14, thus avoiding signaling overhead in the video bitstream 14.

2.6 Treatment of No Output Pictures and Implications on Constant Output Frame Rate As discussed above, if some pictures are not output it might be complicated to derive output times when not present in PT SEI message or when PT SEI messages are ignored.

When PT SEI messages are present noOuptut pictures have an associated output time but such an output time is simply ignored as the picture is not output. Counting such a picture that is decoded in the bitstream as "occupying" a output time slot would lead to the distance between two output pictures that are actually output to not be equidistant anymore as illustrated below in FIG. 14. E.g., in the example of FIG. 14, picture 26* is indicated as noOutput picture, e.g. by means of layer affiliation. In other words, FIG. 8 Illustrates an example of non-equidistant pictures in case of no-output pictures.

According to a first embodiment of this sub-aspect, decoder 50 is configured to decode a parameter set including a fixed-picture rate flag, e.g. the one as in section 2.5, indicative of whether a picture output for the video data stream involves a fixed picture rate and, if the fixed-picture rate flag indicates that the picture output involves a fixed picture rate, an elemental output picture duration syntax element. According to this embodiment, decoder 50 decodes from the video data stream 14, for each picture, a picture output flag indicative of whether the respective picture is to be displayed or not. According to this embodiment, decoder 50 infers that a picture, e.g. picture 26' of FIG. 14, which precedes, in output order, a further picture indicated not to be output, e.g. picture 26\* of FIG. 14, is to be subject to repeated output.

In other words, in one embodiment, e.g. in examples of the one of the previous paragraph, the flag that indicates whether a picture is output or not, i.e. (ph_pic_output_flag) is taken into account for derivation of the output times, i.e. the decoder is prepared to receive a picture that does not needs to be displayed, i.e. no constant output from the decoder. In such a case the constant display rate is achieved and there is a bitstream constraint that the preceding picture in output order needs to compensate it through repetition.

According to a second embodiment, encoder 10 is, configured to encode into the video data stream 14 the parameter set including the fixed-picture rate flag and, if the fixed-picture rate flag indicates that the picture output involves a fixed picture rate, an elemental output picture duration syntax element. According to this embodiment, encoder 10 is configured to encode into the video data stream 14, for each picture, the picture output flag indicative of whether the respective picture is to be displayed or not. According to this embodiment, if the fixed-picture rate flag indicates that a picture output for the video data stream 14 involves a fixed picture rate, encoder 10 sets the picture output flags for each picture as being indicative that the respective picture is to be displayed. Alternatively or additionally, if the fixed-picture rate flag indicates that a picture output for the video data stream 14 involves a fixed picture rate, encoder 10 sets the picture output flags for each picture which is not the first picture of a coded video sequence of the video data stream 14 as being indicative that the respective picture is to be displayed. Alternatively or additionally, if the fixed-picture rate flag indicates that a picture output for the video data stream 14 involves a fixed picture rate, encoder 10 sets the picture output flags for each picture which is not the first picture of a coded video sequence of the video data stream 14 or which is within a coded video sequence of the video data stream 14 and not exclusively preceded by other no-output pictures, as being indicative that the respective picture is to be displayed. Thus, for example, encoder 10 provides the video bitstream 14 so that the decoder is able to Infer that a picture which precedes, in output order, a further picture indicated not to be output, is to be subject to repeated output.

In examples, encoder 10 is configured to encode a flag into the video data stream 14 which indicates whether or not the picture output flag for each picture is set as being indicative that the respective picture is to be displayed. Alternatively or additionally, the flag indicates whether or not the picture output flag for each picture which is not the first picture of a coded video sequence of the video data stream 14 is set as being indicative that the respective picture is to be displayed. Alternatively or additionally, the flag indicates whether or not the picture output flag for each picture which is not the first picture of a coded video sequence of the video data stream 14 or which is within a coded video sequence of the video data stream 14 and not exclusively preceded by other no-output pictures, is set as being indicative that the respective picture is to be displayed.

In examples, encoder 10 is configured to set the flag in case that the fixed-picture rate flag indicates that a picture output for the video data stream 14 involves a fixed picture rate.

In other words, in another embodiment, e.g. in examples of the second one, when there is a fix picture rate indicated in the bitstream, there is a bitstream constraint that prohibits
- a non-output picture within the bitstream, or
- at least a non-output picture that is not the first AU in the CVS, or
- once there is an output picture in the CVS, there cannot be any further no-output picture following that output picture in the CVS.

In another embodiment a bitstream constraint is added that indicates that no output pictures are constraint as a broader concept not only applicable to fixed picture rate.

| | Descriptor |
|---|---|
| general_constraint_info( ) { | |
|   general_non_packed_constraint_flag | u(1) |
|   [...] | |
|   general_no_no_output_pics_constraint_flag | u(1) |
|   [...] | |
|   while( !byte_aligned( ) ) | |
|     gci_alignment_zero_bit | f(1) |
|   gci_num_reserved_bytes | u(8) |
|   for( i = 0; i < gci_num_reserved_bytes; i++ ) | |
|     gci_reserved_byte[ i ] | u(8) |
| } | | general_no_no_output_pics_constraint_flag equal to 1 specifies that ph_pic_output_flag shall be equal to 1. general_no_no_output_pics_constraint_flag equal to 0 does not impose such a constraint, Further, when the fixed picture rate is used, there is a bitstream constraint that the constraint flag needs to be set.

It is a requirement of bitstream conformance that when fixed_pic_rate_general_flag[i] is equal to 1 for any value of i, general_no_no_output_pics_constraint_flag shall be equal to 1.

3. Further Embodiments

In the previous sections, although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. A decoder for decoding a video data stream, the decoder comprising:
at least one processor configured to perform operations comprising:
decoding a parameter set including a first syntax element indicating whether network abstraction layer (NAL) hypothetical reference decoder (HRD) parameters are present, a second syntax element indicating whether video coding layer (VCL) hypothetical reference decoder (HRD) parameters are present, a fixed-picture rate flag indicative of whether a picture output involves a fixed picture rate within a coded video sequence, and, if the fixed-picture rate flag indicates that the picture output involves a fixed picture rate within the coded video sequence, an elemental output picture duration syntax element; and
based at least in part on determining that the first syntax element indicates that NAL HRD parameters are not present and the second syntax element indicates that VCL HRD parameters are not present:
determining elemental picture output times for the coded video sequence based on the elemental output picture duration syntax element; and
inferring that a picture output multiplication syntax element in a picture timing supplemental enhancement information message of the video data stream, which reveals information on whether or not a respective access unit is subject to multiplied output and, if so, how many sequential output pictures are to be generated out of the respective access unit, indicates non multiplied output.

2. The decoder of claim 1, wherein:
the fixed-picture rate flag comprises fixed_pic_rate_within_cvs_flag;

the first syntax element comprises general_nal_hrd_params_present_flag;
the elemental output picture duration syntax element comprises elemental_duration_in_tc_minus1;
the second syntax element comprises general_vcl_hrd_params_present_flag; and
the picture output multiplication syntax element comprises pt_display_elemental_periods_minus1.

3. The decoder of claim 1, the operations further comprising:
wherein the fixed-picture rate flag comprises fixed_pic_rate_within_cvs_flag, and wherein the fixed-picture rate flag is decoded based on a fixed_pic_rate_general_flag having a value of 1.

4. An encoder for encoding a video data stream, the encoder comprising:
at least one processor configured to perform operations comprising:
encoding a parameter set into the video data stream, including a first syntax element indicating whether network abstraction layer (NAL) hypothetical reference decoder (HRD) parameters are present, a second syntax element indicating whether video coding layer (VCL) hypothetical reference decoder (HRD) parameters are present, a fixed-picture rate flag indicative of whether a picture output involves a fixed picture rate within a coded video sequence, and, if the fixed-picture rate flag indicates that the picture output involves a fixed picture rate within the coded video sequence, an elemental output picture duration syntax element; and
based at least in part on determining that the first syntax element indicates that NAL HRD parameters are not present and the second syntax element indicates that VCL HRD parameters are not present:
elemental picture output times are determinable for the coded video sequence based on the elemental output picture duration syntax element; and
a picture output multiplication syntax element in a picture timing supplemental enhancement information message of the video data stream, which reveals information on whether or not a respective access unit is subject to multiplied output and, if so, how many sequential output pictures are to be generated out of the respective access unit, is inferable to indicate non multiplied output.

5. The encoder of claim 4, wherein:
the fixed-picture rate flag comprises fixed_pic_rate_within_cvs_flag;
the first syntax element comprises general_nal_hrd_params_present_flag;
the elemental output picture duration syntax element comprises elemental_duration_in_tc_minus1;
the second syntax element comprises general_vcl_hrd_params_present_flag; and
the picture output multiplication syntax element comprises pt_display_elemental_periods_minus1.

6. The encoder of claim 4, the operations further comprising:
wherein the fixed-picture rate flag comprises fixed_pic_rate_within_cvs_flag, and wherein the fixed-picture rate flag is decoded based on a fixed_pic_rate_general_flag having a value of 1.

7. A method of decoding a video data stream, the method comprising:
decoding a parameter set including a first syntax element indicating whether network abstraction layer (NAL) hypothetical reference decoder (HRD) parameters are present, a second syntax element indicating whether video coding layer (VCL) hypothetical reference decoder (HRD) parameters are present, a fixed-picture rate flag indicative of whether a picture output involves a fixed picture rate within a coded video sequence, and, if the fixed-picture rate flag indicates that the picture output involves a fixed picture rate within the coded video sequence, an elemental output picture duration syntax element; and
based at least in part on determining that the first syntax element indicates that NAL HRD parameters are not present and the second syntax element indicates that VCL HRD parameters are not present:
determining elemental picture output times for the coded video sequence based on the elemental output picture duration syntax element; and
inferring that a picture output multiplication syntax element in a picture timing supplemental enhancement information message of the video data stream, which reveals information on whether or not a respective access unit is subject to multiplied output and, if so, how many sequential output pictures are to be generated out of the respective access unit, indicates non multiplied output.

8. A non-transitory computer-readable medium storing a computer program for implementing the method of claim 7 when executed on a computer or signal processor.

9. The method of claim 7, wherein:
the fixed-picture rate flag comprises fixed_pic_rate_within_cvs_flag;
the first syntax element comprises general_nal_hrd_params_present_flag;
the elemental output picture duration syntax element comprises elemental_duration_in_tc_minus1;
the second syntax element comprises general_vcl_hrd_params_present_flag; and
the picture output multiplication syntax element comprises pt_display_elemental_periods_minus1.

10. The method of claim 7, further comprising:
wherein the fixed-picture rate flag comprises fixed_pic_rate_within_cvs_flag, and
wherein the fixed-picture rate flag is decoded based on a fixed_pic_rate_general_flag having a value of 1.

11. A method of encoding a video data stream, the method comprising:
encoding a parameter set into the video data stream, including a first syntax element indicating whether network abstraction layer (NAL) hypothetical reference decoder (HRD) parameters are present, a second syntax element indicating whether video coding layer (VCL) hypothetical reference decoder (HRD) parameters are present, a fixed-picture rate flag indicative of whether a picture output involves a fixed picture rate within a coded video sequence, and, if the fixed-picture rate flag indicates that the picture output involves a fixed picture rate within the coded video sequence, an elemental output picture duration syntax element; and
based at least in part on determining that the first syntax element indicates that NAL HRD parameters are not present and the second syntax element indicates that VCL HRD parameters are not present:
elemental picture output times are determinable for the coded video sequence based on the elemental output picture duration syntax element; and
a picture output multiplication syntax element in a picture timing supplemental enhancement information message of the video data stream, which reveals information on whether or not a respective access unit is subject to multiplied output and, if so, how many sequential output pictures are to be generated out of the respective access unit, is inferable to indicate non multiplied output.

12. A non-transitory computer-readable medium storing a computer program for implementing the method of claim 11 when executed on a computer or signal processor.

13. The method of claim 11, wherein:
   the fixed-picture rate flag comprises fixed_pic_rate_within_cvs_flag;
   the first syntax element comprises general_nal_hrd_params_present_flag;
   the elemental output picture duration syntax element comprises elemental_duration_in_tc_minus1;
   the second syntax element comprises general_vcl_hrd_params_present_flag; and
   the picture output multiplication syntax element comprises pt_display_elemental_periods_minus1.

14. The method of claim 11, further comprising:
   wherein the fixed-picture rate flag comprises fixed_pic_rate_within_cvs_flag, and wherein the fixed-picture rate flag is decoded based on a fixed_pic_rate_general_flag having a value of 1.

\* \* \* \* \*